US007027066B2

(12) United States Patent
Ohmori

(10) Patent No.: US 7,027,066 B2
(45) Date of Patent: Apr. 11, 2006

(54) GRAPHICS PLOTTING APPARATUS

(75) Inventor: Mutsuhiro Ohmori, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 11/044,558

(22) Filed: Jan. 26, 2005

(65) Prior Publication Data

US 2005/0128204 A1 Jun. 16, 2005

Related U.S. Application Data

(63) Continuation of application No. 09/796,901, filed on Feb. 28, 2001.

(30) Foreign Application Priority Data

Feb. 29, 2000 (JP) .......................... P2000-102863

(51) Int. Cl.
*G06T 15/00* (2006.01)
*G06T 13/14* (2006.01)
*G09G 5/00* (2006.01)

(52) U.S. Cl. ...................... 345/582; 345/610; 345/519; 345/540; 345/552; 345/586

(58) Field of Classification Search ........ 345/418–428, 345/581–582, 586, 589, 593, 596–597, 606, 345/610–612, 687, 549, 501–506, 538, 540–545, 345/552, 559, 519, 522; 348/668, 497; 358/518, 358/525; 382/269, 162
See application file for complete search history.

(56) References Cited

U.S. PATENT DOCUMENTS

| | | | | |
|---|---|---|---|---|
| 5,392,393 | A * | 2/1995 | Deering | 345/505 |
| 5,517,611 | A * | 5/1996 | Deering | 345/503 |
| 5,977,984 | A * | 11/1999 | Omori | 345/589 |
| 6,137,046 | A * | 10/2000 | Kamiya | 84/604 |
| 6,215,467 | B1 * | 4/2001 | Suga et al. | 345/660 |
| 6,466,219 | B1 * | 10/2002 | Shino | 345/531 |
| 6,473,091 | B1 * | 10/2002 | Iida et al. | 345/589 |
| 6,727,905 | B1 * | 4/2004 | Narita | 345/574 |

* cited by examiner

*Primary Examiner*—Matthew C. Bella
*Assistant Examiner*—Wesner Sajous
(74) *Attorney, Agent, or Firm*—Bell, Boyd & Lloyd LLC

(57) ABSTRACT

A graphics plotting apparatus which can realize both optimum division of a processing system into blocks and optimum arrangement of the blocks and can be augmented in terms of the performance for a three-dimensional graphics plotting process. The graphics plotting apparatus includes a logic circuit block and a memory block having a capacity sufficient to store display data to be displayed. Both blocks are built in the same chip. An input buffer having a capacity for more than one apex of a three-dimensional graphics plotting primitive is provided, and an interface for transfer of data to and from the outside and the input buffer are arranged on one side of the logic circuit block. A DDA setup circuit is arranged adjacent the input buffer, and a triangle DDA circuit is arranged adjacent the DDA setup circuit. A pair of texture processing circuit blocks are arranged adjacent the triangle DDA circuit. The block sizes of the texture processing circuit blocks are set greater than those of the DDA setup circuit and the triangle DDA circuit.

29 Claims, 17 Drawing Sheets

PAGE (ROW)
PAGE ADDRESS=(y [10:5] × bw + x [10:6])
bw: WIDTH OF BUFFER (DESIGNATE n OF 64×n)

BLOCK (COLUMN)
BLOCK ADDRESS=(y[3], x[3], y[2:1])

| | | | |
|---|---|---|---|
| 0 | 4 | 16 | 20 |
| 1 | 5 | 17 | 21 |
| 2 | 6 | 18 | 22 |
| 3 | 7 | 19 | 23 |
| 8 | 12 | 24 | 28 |
| 9 | 13 | 25 | 29 |
| 10 | 14 | 26 | 30 |
| 11 | 15 | 27 | 31 |

GRAPHICS PLOTTING APPARATUS

CROSS REFERENCE TO RELATED APPLICATIONS

This patent application is a continuation of U.S. application Ser. No. 09/796,901, filed on Feb. 28, 2001, the disclosure of which is herein incorporated by reference. This patent application claims priority to Japanese Patent Document No. 2000-102863, filed on Feb. 29, 2000, the disclosure of which is herein incorporated by reference.

BACKGROUND OF THE INVENTION

The present invention relates to a graphics plotting apparatus which includes a logic circuit block and a memory block of a large storage capacity such as a DRAM (Dynamic Random Access Memory) both mounted on a common semiconductor chip and which implements three-dimensional graphics plotting and, more particularly, to an arrangement of various functioning blocks in a graphics plotting apparatus for augmenting the performance of the entire apparatus.

A graphics plotting image processing apparatus is conventionally known which uses, in addition to an external memory block which is known, a large capacity memory such as a DRAM built in a chip in which a plotting logic circuit is built.

An aimed plotting performance can be comparatively and readily obtained from performances of semiconductor devices in recent years. Therefore, a two-dimensional graphics plotting processing apparatus is configured simply such that, alongside and in the proximity of a graphics plotting processing logic circuit, which is used conventionally, a DRAM core having a control mechanism equivalent to that for a DRAM for universal use is disposed, and the graphics logic plotting processing logic circuit and the DRAM core are connected to each other by a single bus.

Also, a block which performs two-dimensional graphics plotting processing is designed, using a technique such as a gate array, without taking a positional relationship of various processing blocks into consideration in order for the area to take precedence.

In recent years, however, where it is intended to construct a three-dimensional graphics plotting image processing apparatus, even if the capabilities of semiconductor devices are made the most of, further augmentation of the performance is still demanded.

On the other hand, if a three-dimensional graphics plotting image processing apparatus is constructed so as to minimize the area without placing a stress on the performance as with such a two-dimensional graphics plotting processing logic circuit as described above, then not such an arrangement method wherein individual logical blocks are divided into corresponding physical blocks as seen in FIG. 18A but such an arrangement method as illustrated in FIG. 18B is used. In particular, a functioning block 1 is not divided into a host interface block 2, an input buffer block 3, a straight line plotting setup block 4, a straight line plotting block 5 and a display control block 6 as seen in FIG. 18A. Rather, the logic circuits just mentioned are collected into a single block and laid out as a single physical block 8 as seen in FIG. 18B using a gate array technique.

However, in a three-dimensional graphics plotting process, much importance is attached, in particular, to the performance. Therefore, both optimum division of a processing system into blocks and optimum arrangement of the blocks are significant.

SUMMARY OF THE INVENTION

The present invention provides in an embodiment a graphics plotting apparatus which can realize both optimum division of a processing system into blocks and optimum arrangement of the blocks and is augmented in terms of the performance for a three-dimensional graphics plotting process.

According to an aspect of the present invention, there is provided a graphics plotting apparatus which performs a rendering process, including a logic circuit block, a memory block having a capacity sufficient to store display data to be displayed, the logic circuit block and the memory block being built in the same chip, and an input buffer provided at an input portion of the logic circuit block and having a capacity for more than one apex of a three-dimensional graphics plotting primitive.

The graphics plotting apparatus may further include an interface section for transferring data to and from the outside, the interface section being arranged on one side of the logic circuit block.

In addition, the graphics plotting apparatus may further include an initialization arithmetic operation circuit block for linear interpolation operation arranged adjacent the input buffer. In this instance, the graphics plotting apparatus may include a linear interpolation processing circuit block arranged adjacent the initialization arithmetic operation block for linear interpolation operation. Furthermore, the graphics plotting apparatus may further comprise a texture processing circuit block arranged adjacent the linear interpolation operation processing circuit block.

The graphics plotting apparatus may also include a circuit block for performing a graphics process, and a register arranged between the memory block having the capacity to sufficiently store display data, operation of the register being uncontrollable from the circuit block for performing a graphics process.

Preferably, the memory block having the capacity sufficient to store display data has two or more ports.

Preferably, the texture processing circuit block has a block size greater than those of the initialization arithmetic operation circuit block for linear interpolation operation and the linear interpolation processing circuit block.

The memory block may be divided into, and distributed in, a number of blocks which are arranged around the logic circuit block, and the graphics plotting apparatus may further include a part for interleaving addresses of the distributed memory blocks so that the distributed blocks may be accessed in order by successive accessing in at least one direction of a display area for the display data.

Preferably, the initialization arithmetic operation circuit block for linear interpolation operation has a temporally parallel structure of a synchronizing pipeline system, and the texture processing circuit block has a spatially parallel structure wherein a number of circuits of a same structure are juxtaposed.

Preferably, the memory block is formed from a DRAM used as a display buffer, and an SRAM is connected to some of ports of the DRAM, the memory block transferring a number of column data at a time to the SRAM by accessing to the DRAM in a row direction.

The initialization arithmetic operation circuit block for linear interpolation operation may first calculate values only of a representative place of a number of pixels and then calculate values of other neighboring pixels by addition of fixed values calculated already from the representative points.

The initialization arithmetic operation circuit block for linear interpolation operation may discriminate through positive/negative discrimination of a linear expression whether or not a noticed point is in the inside of a triangle.

The initialization arithmetic operation circuit block for linear interpolation operation may be mounted using an ASIC technique.

The linear interpolation processing circuit block may perform processing of pixels within a fixed united range which is set independently of a form of a display memory and independently of a page boundary of the display memory.

Preferably, the graphics plotting apparatus further includes a FIFO (first-in first-out) buffer disposed on a receiving side of a bus between circuit blocks which are physically separate from each other, a signal for notification that the first-in first-out buffer will be fully occupied soon being transmitted to a data transmitting side one of the circuit blocks so that stopping of transfer from the data transmitting side circuit block may be performed from the other data receiving side circuit block.

According to another aspect of the present invention, there is provided a graphics plotting apparatus which receives polygon rendering data of apexes of a unit graphic form including three-dimensional coordinates (x, y, z), red, green and blue data, homogeneous coordinates (s, t) of a texture and a homogeneous term q to perform a rendering process, including a memory block for storing display data and texture data required at least by one graphic form element, a logic circuit block including an interpolation processing circuit block for interpolating polygon rendering data of the apexes of the unit graphic form to produce interpolation data of pixels positioned in the unit graphic form and a texture processing circuit block for dividing the homogeneous coordinates (s, t) of the texture included in the interpolation data by the homogeneous term q to produce s/q and t/q, reading out the texture data from the memory block using texture addresses corresponding to s/q and t/q and performing application processing of the texture data to the surface of the graphic form elements of the display data, and an input buffer provided at an input portion for the polygon rendering data of the interpolation processing circuit block of the logic circuit block and having a capacity for more than one apex of a three-dimensional graphics plotting primitive, the memory block, the logic circuit block and the input buffer being mounted in a mixed state in one semiconductor chip.

In a graphics plotting apparatus wherein memory element blocks having a capacity sufficient to store display data to be displayed are built in the same chip, it is very significant to pay attention to an arrangement of layout blocks which perform various processes in order to realize a high performance. There is a tendency that transfer of data has an increasing influence on the performance when compared with the arithmetic operation performance itself.

Therefore, the present invention takes such countermeasures as described below.

First, in order to allow processing of data inputted to be performed optimally, the graphics plotting apparatus includes an input buffer of a capacity for more than one apex of a plotting primitive (principally a triangle) and, therefore, at a point of time when data for one apex are prepared, almost any processing can be started.

Consequently, data for a next apex can be stored parallelly before next processing is enabled and, accordingly, interruptions of processing are reduced.

Further, the arrangement of an interface section for data transfer to and from the outside on one side of the logic circuit block allows minimization of the dispersion and the length of wiring lines from the interface section to the processing block.

This is significant also in order to make it possible to form interface wiring lines to a host processor on a circuit board readily in an equal length. This countermeasure is very significant to high speed data transfer.

Further, an initialization arithmetic operation circuit block for linear interpolation operation is arranged adjacent the data inputting/outputting section for data transfer, and a linear interpolation processing circuit block is arranged adjacent the initialization arithmetic operation circuit block for linear interpolation operation.

In three-dimensional graphics plotting according to the present invention, a texture process for applying a pattern to a graphic form is performed. Since the process is performed immediately after the liner interpolation operation process, in order to optimize the transfer path therefor, a texture processing circuit block is arranged adjacent the linear interpolation operation processing circuit block.

Since the memory blocks having a capacity sufficient to store display data in almost all cases assume a very large area such as more than one half the area of a chip, the lengths themselves of wiring lines between the display buffer and a block which performs graphics processing are comparatively great and have a great dispersion.

Therefore, where the system is configured such that a register whose operation cannot be controlled from the block which performs graphics processing can be inserted in and arranged at one or both of the input and the output of the display buffer, the delay times by the wiring lines which are long and delay signal transfer can be fixed within a fixed range and the performance of the entire system can be augmented.

Further, where the memory block which can sufficiently store display data is constructed so as to have two or more ports, the transfer performance can be augmented although the memory block itself has a greater size.

Particularly, upon three-dimensional graphics plotting, where writing into the display memory, reading out from the texture memory which is physically same as the display memory and reading out from the display memory for displaying data can be performed simultaneously and parallelly, the performance of the entire system can be augmented.

The architecture of the entire system is constructed such that the sizes of the initialization arithmetic operation circuit for linear interpolation operation and the linear interpolation processing circuit block may not become greater than that of the texture processing block.

Further, the memory block is divided into and distributed in a plurality of blocks arranged around the logic circuit block and addresses of the distributed memory blocks are interleaved such that the distributed memory blocks may be accessed in order by successive accessing to the display area at least in one direction. Consequently, dispersions in power compensation and voltage drop in the inside of the chip are reduced.

Furthermore, where the memory block is formed from a DRAM, interruption of processing by a page break upon memory accessing can be concealed.

The initialization arithmetic operation circuit block for linear interpolation operation is formed with a temporally parallel structure according to a synchronous pipeline system and the texture processing circuit block is formed with a spatially parallel structure wherein a number of circuits of the same structure are juxtaposed. Consequently, in initialization arithmetic operation for linear interpolation operation, the initialization arithmetic operation circuit block can be made smaller than the texture processing circuit block through the temporally parallel scheme. Meanwhile, in texture processing wherein the bandwidth with the memory becomes a bottleneck, the bus width to the memory can be secured readily through the spatially parallel scheme.

The memory block used as the display buffer is a DRAM and an SRAM is directly coupled to some ports of the DRAM. Data of a plurality of columns of the memory block are transferred to the SRAM at once by accessing to the DRAM in the row direction. Consequently, a page break of the DRAM can be concealed. Further, the efficiency in accessing to the other ports of the DRAM can be augmented.

Further, the initialization arithmetic operation circuit block for linear interpolation operation is mounted using the ASIC technique and calculates values at a representative place of a number of pixels first and then calculates values of the other neighboring pixels through addition of a fixed value calculated already from the representative point and discriminates through a positive/negative discrimination of a linear expression whether or not a noticed point is within a triangle. Consequently, the linear interpolation operation part can be made smaller than the texture processing part.

The linear interpolation processing circuit block performs processing of pixels within a fixed range which is set independently of the form of the display memory and independently of a page boundary. Consequently, processing of those pixels which are not plotted actually can be reduced, and the circuit scale for achieving the object performance can be reduced.

Furthermore, a FIFO buffer is arranged on the receiving side of a bus between circuit blocks which are physically separate from each other and a signal for notification that the FIFO will be fully occupied soon is issued from the receiving side to the data signaling side to stop operation of the data signaling side. Consequently, a pipe can be inserted into a control signal between the circuit blocks, and the operation frequency of the entire system can be raised.

With the graphic plotting apparatus of the present invention described above, since it includes an input buffer having a capacity for more than one apex of a plotting primitive (principally a triangle) so that processing of inputted data may be performed optimally, almost any processing can be started at a point of time when data for one apex are prepared. Therefore, data for a next apex can be stored parallelly before next processing is enabled and, consequently, interruptions of processing are reduced.

Further, the arrangement of the interface for data transfer to and from the outside on one side of the logic circuit block allows minimization of the dispersion and the length of the wiring lines from the interface to the processing block. In order to allow such arrangement, it can be set as a target to design the width and the transfer rate as well as the transfer protocol of the bus to the host apparatus as wiring lines of the system so that they may be optimum to both the process generation and a package of a semiconductor to be used.

Since an initialization arithmetic operation circuit block for linear interpolation operation is arranged adjacent the interface for data transfer and a linear interpolation processing circuit block is arranged adjacent the initialization arithmetic operation block for linear interpolation operation, data can be transferred in the highest efficiency with regard: to initialization arithmetic operation for linear interpolation operation to fully use the bandwidth of data transfer to and from the host apparatus. The arrangement of the initialization arithmetic operation block for linear interpolation operation at the specific place realizes optimum data transfer in a pipeline structure for data processing in the three-dimensional graphics plotting processing method of the present invention. Generally speaking, the types of blocks to be processed and an optimum arrangement relationship of them can be specified depending upon the type of a three-dimensional graphics process to be performed.

While three-dimensional graphics plotting involves a texture process for applying a pattern to a graphic form, since the processing in the present embodiment is performed immediately after the linear interpolation operation process, the texture processing block is arranged adjacent the linear interpolation operation processing circuit block. Consequently, the transfer path between them is optimized.

Further, the function allocation is performed so that the size of the texture processing circuit may be greater than the sizes of the blocks in the preceding processing stages to them. Consequently, the texture processing circuit block which accesses a memory of a large capacity most frequently can be arranged readily so that it can optimally access the memory of the large capacity arranged around the same.

Further, since the system is constructed such that a register whose operation cannot be controlled from the block which performs graphics processing can be inserted in and arranged at one or both of the input and the output of the display buffer, the delay times by the wiring lines which are long and delay signal transfer can be fixed within a fixed range and the performance of the entire system can be augmented.

Further, where a register whose operation cannot be controlled such as to stop the operation is employed, the necessity to take a delay or the like of a controlling signal therefor into consideration is eliminated and the limitation to the performance can be raised.

Further, where the memory block which can sufficiently store display data is constructed so as to have two or more ports, the transfer performance can be augmented although the memory block itself has a greater size.

Particularly, upon three-dimensional graphics plotting, since writing into the display memory, reading out from the texture buffer which is physically the same as the display memory and reading out from the display memory for displaying data can be performed simultaneously and parallelly, the performance of the entire system can be augmented. Not an architecture wherein long wiring lines are required in a large area, but another architecture wherein wiring lines can be concluded locally, although a comparatively large area is required, is advantageous to a semiconductor process which is estimated to require further refined working in the future.

Further, since addresses of the distributed memory blocks are interleaved such that the distributed memory blocks may be accessed in order by successive accessing to the display area at least in one direction, dispersions in power compensation and voltage drop in the inside of the chip are reduced. Furthermore, where the memory block is formed from a DRAM, interruption of processing by a page break upon memory accessing can be concealed.

Further, where the linear interpolation operation section has a temporally parallel structure according to a synchronous pipeline system and the texture processing circuit section has a spatially parallel structure wherein a number of circuits of the same structure are juxtaposed, in initialization arithmetic operation for linear interpolation operation, the initialization arithmetic operation circuit block can be made smaller than the texture processing circuit block through the temporally parallel scheme. Meanwhile, in texture processing wherein the bandwidth with the memory becomes a bottleneck, the bus width to the memory can be secured readily through the spatially parallel scheme.

Where data of a number of columns of the memory block are transferred to an SRAM at once by accessing to the DRAM in the row direction, a page break of the DRAM can be concealed. Further, the efficiency in accessing to the other ports of the DRAM can be augmented.

Further, the initialization arithmetic operation circuit block for linear interpolation operation is mounted using the ASIC technique and calculates values at a representative place of a number of pixels first and then calculates values of the other neighboring pixels through addition of a fixed value calculated already from the representative point and discriminates through a positive/negative discrimination of a linear expression whether or not a noticed point is within a triangle. Consequently, the linear interpolation operation part can be made smaller than the texture processing part.

The linear interpolation processing circuit block performs processing of pixels within a fixed range which is set independently of the form of the display memory and independently of a page boundary. Consequently, processing of those pixels which are not plotted actually can be reduced, and the circuit scale for achieving the object performance can be reduced.

Furthermore, a FIFO buffer is arranged on the receiving side of a bus between circuit blocks which are physically separate from each other and a signal for notification that the FIFO will be fully occupied soon is issued from the receiving side to the data signaling side to stop operation of the data signaling side. Consequently, a pipe can be inserted into a control signal between the circuit blocks. Accordingly, the operation frequency of the entire system can be raised.

Additional features and advantages of the present invention are described in, and will be apparent from, the following Detailed Description of the Invention and the figures.

DETAILED DESCRIPTION OF THE INVENTION

Figure 1:
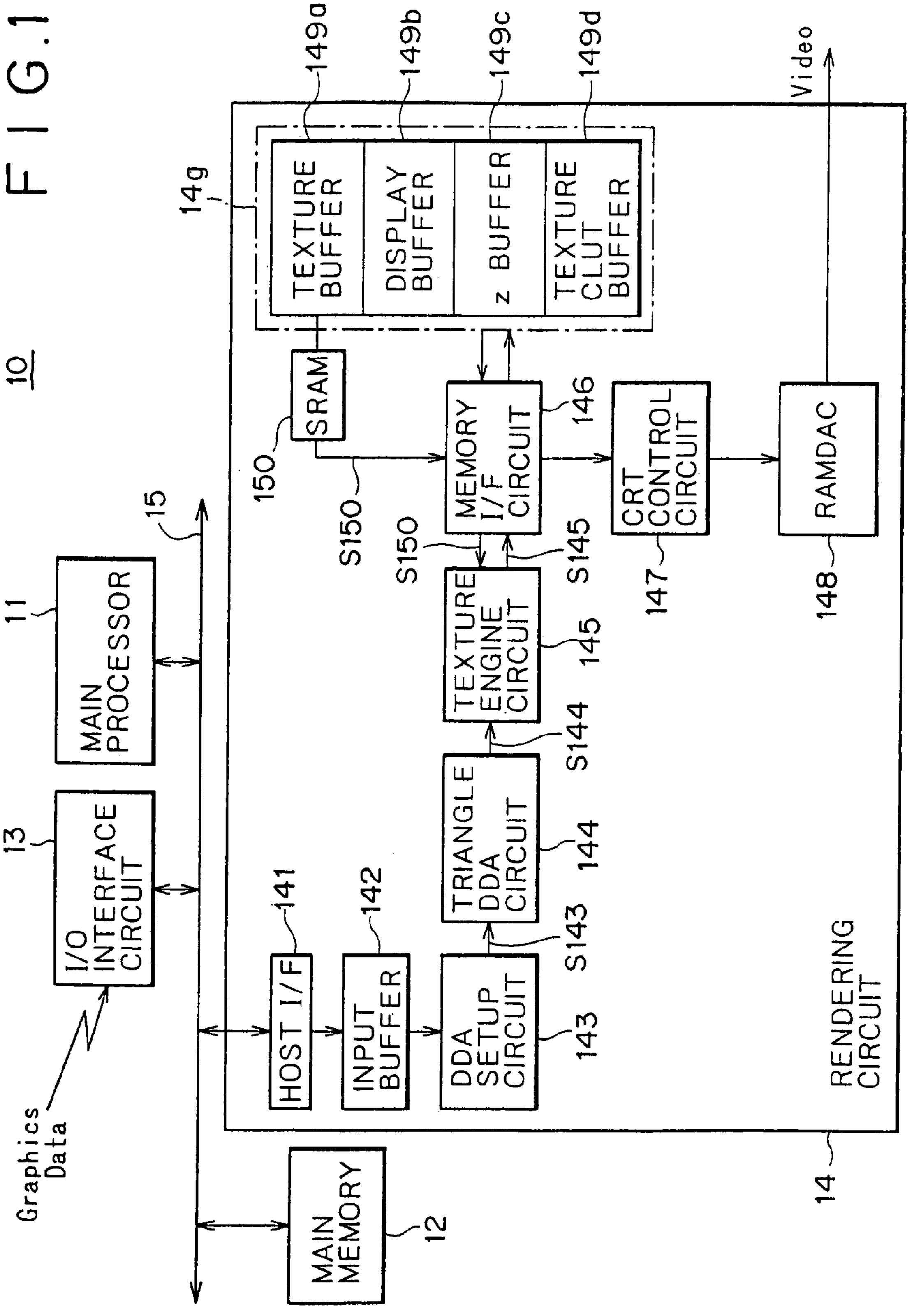
FIG. 1 is a block diagram showing a construction of a three-dimensional computer graphics system to which the present invention is applied.

Referring first to FIG. 1, there is shown a three-dimensional computer graphics system applied to a personal computer or the like as an image processing apparatus according to the present invention wherein a desired three-dimensional image of an arbitrary three-dimensional object model is displayed at a high speed on a display unit such as a CRT (Cathode Ray Tube).

The three-dimensional computer graphics system 10 performs a polygon rendering process of representing a solid model as a combination of triangles (polygons), which are unit graphic forms, determining colors of pixels of a display screen by plotting such polygons, and displaying the solid model on a display unit.

The three-dimensional computer graphics system 10 represents a three-dimensional object using a z coordinate which represents a depth in addition to (x, y) coordinates which represent a position on a plane and specifies an arbitrary point of a three-dimensional space with the three coordinates (x, y, z).

As shown in FIG. 1, the three-dimensional computer graphics system 10 includes a main processor 11, a main memory 12, an I/O interface circuit 13 and a rendering circuit 14 which are connected to one another by a main bus 15.

The main processor 11 reads out necessary graphic data from the main memory 12, for example, in response to a proceeding situation of an application and performs a geometry process such as coordinate conversion, clipping processing or lighting processing to the graphic data to produce polygon rendering data. The main processor 11 outputs polygon rendering data S11 to the rendering circuit 14 through the main bus 15.

The I/O interface circuit 13 receives control information of movement from the outside or polygon rendering data when necessary and outputs the received information or data to the rendering circuit 14 through the main bus 15. The polygon rendering data inputted to the rendering circuit 14 include data (x, y, z, r, g, b, s, t, q) of three apexes of a polygon. The (x, y, z) data represent three-dimensional coordinates of an apex of a polygon, and the (R, G, B) data represent brightness values of the three colors of red, green, blue at the three-dimensional coordinates of the apex of the polygon.

The (s, t) data of the (s, t, q) data represent homogeneous coordinates of a corresponding texture, and the q data of the (s, t, q) data represents a homogeneous term. Actual texture coordinate data (u, v) are obtained by multiplying "s/q" and "t/q" by texture sizes USIZE and VSIZE, respectively.

Accessing to texture data which are stored in a memory block (particularly a texture buffer 149*a* which is hereinafter described) by the rendering circuit 14 is performed using the texture coordinate data (u, v). In particular, the polygon rendering data include physical coordinate values of apexes of a triangle, colors of the apexes, and texture data.

In the following, the rendering circuit 14 is described in detail.

Referring to FIG. 1, the rendering circuit 14 includes a host interface (I/F) circuit 141, an input buffer 142, a DDA (Digital Differential Analyzer) setup circuit 143 as an initialization arithmetic operation block for linear interpolation operation, a triangle DDA circuit 144 as a linear interpolation processing block, a texture engine circuit 145, a memory interface (I/F) circuit 146, a CRT control circuit 147, a RAMDAC circuit 148, a DRAM 149, and an SRAM (Static RAM) 150. The rendering circuit 14 in the embodiment is formed as a single semiconductor chip which includes both of logic circuits and the DRAM 149 which stores at least display data and texture data.

Figure 2:
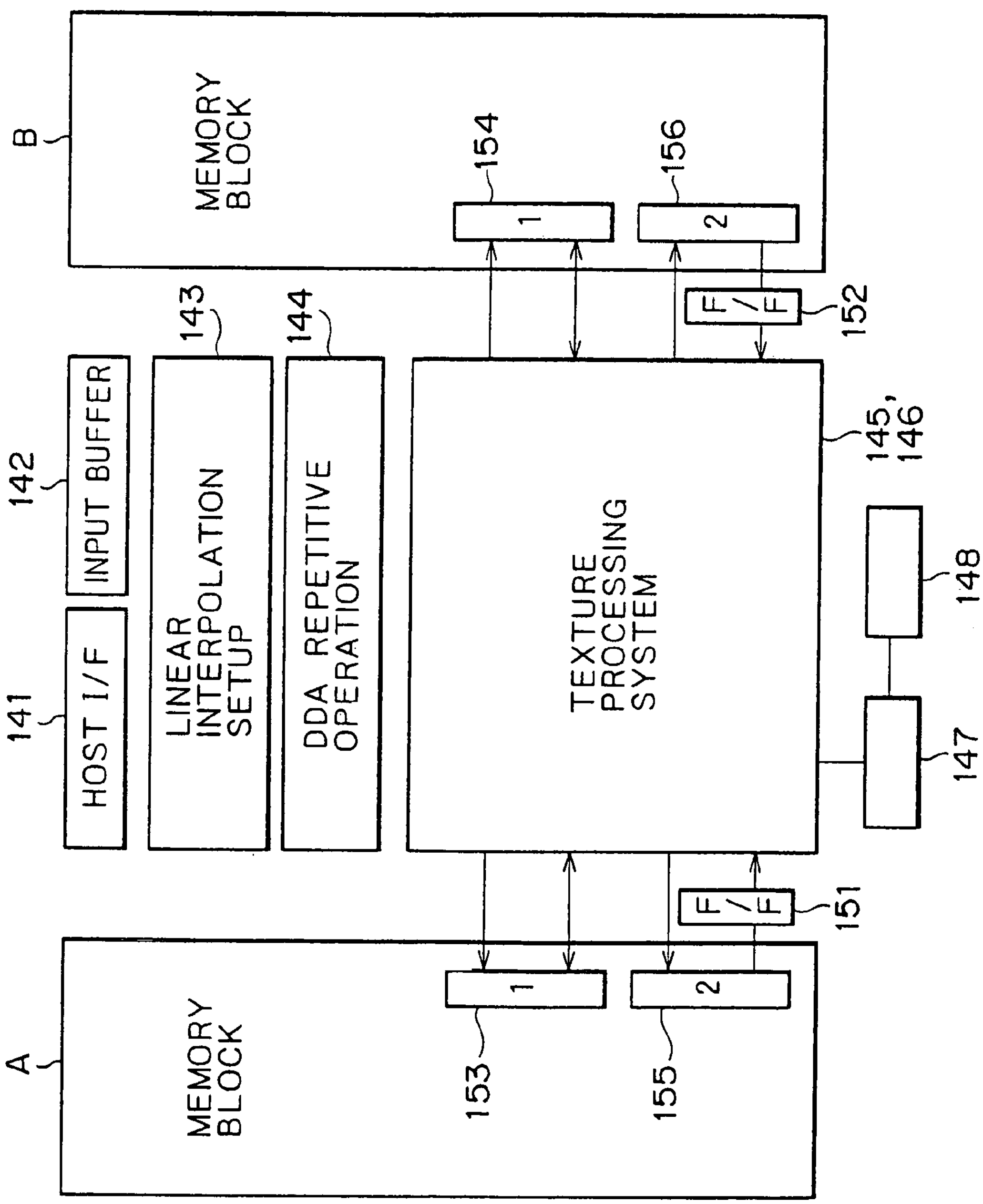
FIG. 2 is a block diagram showing a layout of principal blocks of a rendering circuit shown in FIG. 1.

The DRAM 149 (and SRAM 150) forms a large capacity memory block which can sufficiently store display data to be displayed. As shown in FIG. 2, the large capacity memory block is divided into, for example, two blocks A and B. In the rendering circuit 14, a texture processing system as a logic circuit block which includes the host I/F 141, the input buffer 142, the DDA setup circuit 143, the triangle DDA circuit 144, the texture engine circuit 145, and the memory I/F circuit 146 is arranged between the divisional memory blocks A and B.

In other words, the divisional memory blocks A and B are positioned around the logical circuit block.

In the following, constructions and functions of the blocks of the rendering circuit 14 and the positional relationship between the logical circuit block and the memory blocks are described in order with reference to the drawings.

Host I/F 141

The host I/F 141 performs transfer of data to and from an external circuit of the rendering circuit 14, that is, the main processor 11 or the like through the main bus 15. The host I/F 141 receives the polygon rendering data S11 sent from, for example, the main processor 11, and supplies the polygon rendering data S11 to the input buffer 142.

Input Buffer 142

The input buffer 142 has, for example, a capacity for more than one apex of a plotting primitive (mainly of a triangle) in order to optimally perform processing of input data. The input buffer 142 stores polygon rendering data supplied from the host I/F 141, and supplies the stored data to the DDA setup circuit 143.

The polygon rendering data supplied from the host processor 11 are used to determine color and depth information of pixels in the inside of a triangle on a physical coordinate system through linear interpolation of values of the apexes of the triangle as hereinafter described. When DDA arithmetic operation for the interpolation arithmetic operation is performed, the apex data of the triangle are successively transferred to the DDA setup circuit 143, which is a module for performing setup arithmetic operation for determining equal division of the triangle in the horizontal direction and the vertical direction and so forth, through the host I/F 141 and the input buffer 142.

At this time, data for a number of ones of the apexes of the triangle can be stored into the input buffer 142 through the host I/F 141 so that transfer waiting time is decreased as far as possible thereby to raise the efficiency of the processing.

DDA Setup Circuit 143

The DDA setup circuit 143 performs setup arithmetic operation for determining differences between sides of the triangle and the horizontal direction based on (z, R, G, B, s, t, q) data represented by the polygon rendering data S11 before the triangle DDA circuit 144 in the next stage determines color and depth information of pixels in the inside of the triangle by linear interpolation of values of the apexes of the triangle on a physical coordinate system.

Figure 3:
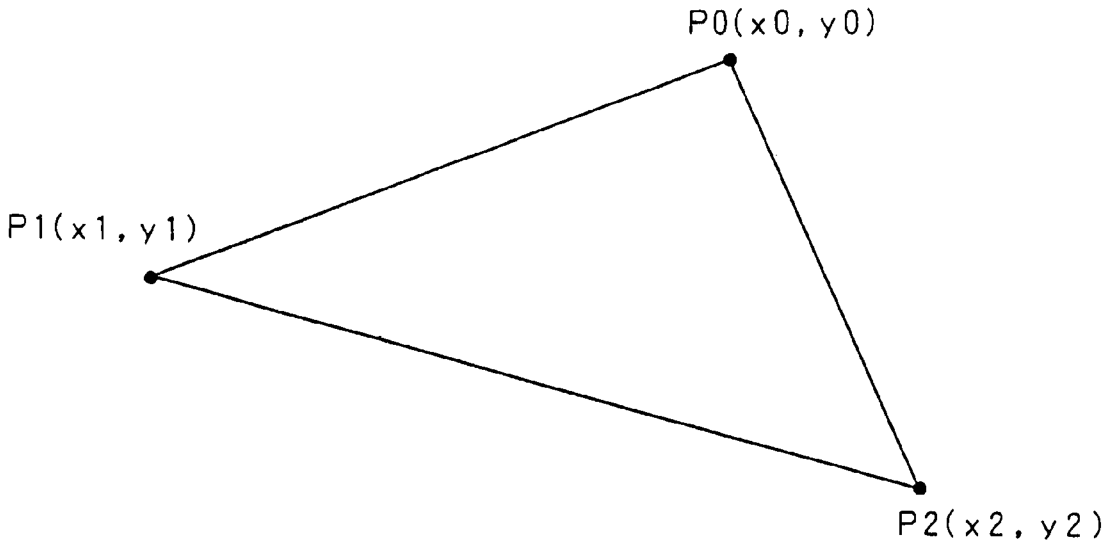
FIG. 3 is a diagrammatic view illustrating a function of a DDA setup circuit shown in FIG. 1.

The setup arithmetic operation particularly calculates variations of values to be determined upon movement by a unit length using the value of a start point, the value of an end point, and a distance between the start point and the end point. The DDA setup circuit 143 outputs variation data S143 calculated in this manner to the triangle DDA circuit 144. The function of the DDA setup circuit 143 is described further with reference to FIG. 3.

As described above, the main processing of the DDA setup circuit 143 is determination of variations in the inside of the triangle defined by three given apexes P0 (x0, y0), P1 (x1, y1), and P2 (x2, y2) to which the several kinds of information (color and texture coordinates) of the apexes which have been specified to physical coordinates through the geometry process in the preceding stage and calculation of basic data for the linear interpolation process in the next stage.

Plotting of a triangle is reduced to plotting of individual pixels and, therefore, the first value at the plotting start point must be determined. Information at the first plotting point is a sum of a product of a horizontal distance from an apex to the first plotting point and a variation in the horizontal direction and another product of a vertical distance and a variation in the vertical direction. Once the value on an integer grating in the inside of the object triangle is determined, the value at any other grating point in the inside of the object triangle can be determined as an integral number of times the variation.

The apex data of the triangle include, for example, x, y coordinates of 16 bits, a z coordinate of 24 bits, RGB color values each of 12 bits (8+4), s, t, q texture coordinates each of a 32-bit floating-point value (IEEE format).

Figure 4:
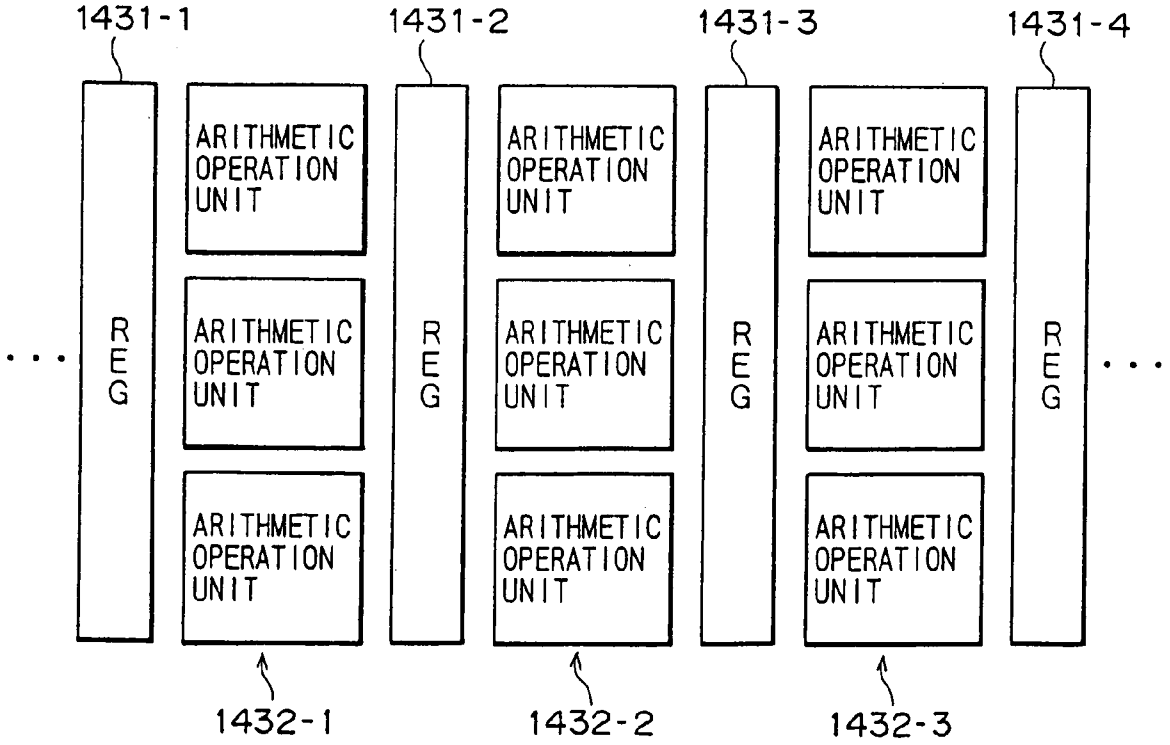
FIG. 4 is a block diagram showing an example of a construction of a triangle DDA circuit shown in FIG. 1.

It is to be noted that the DDA setup circuit 143 is mounted not in a DSP structure as in a conventional system but using the ASIC technique. Particularly, as shown in FIG. 4, the DDA setup circuit 143 is formed as a full data bus logic circuit wherein arithmetic operation unit sets 1432-1 to 1432-3 each including a number of arithmetic operation units arranged parallelly are inserted between registers 1431-1 to 1431-4 arranged in multiple stages, or in other words, formed with a temporally parallel structure of the synchronous pipe line system.

Triangle DDA Circuit 144

Figure 5:
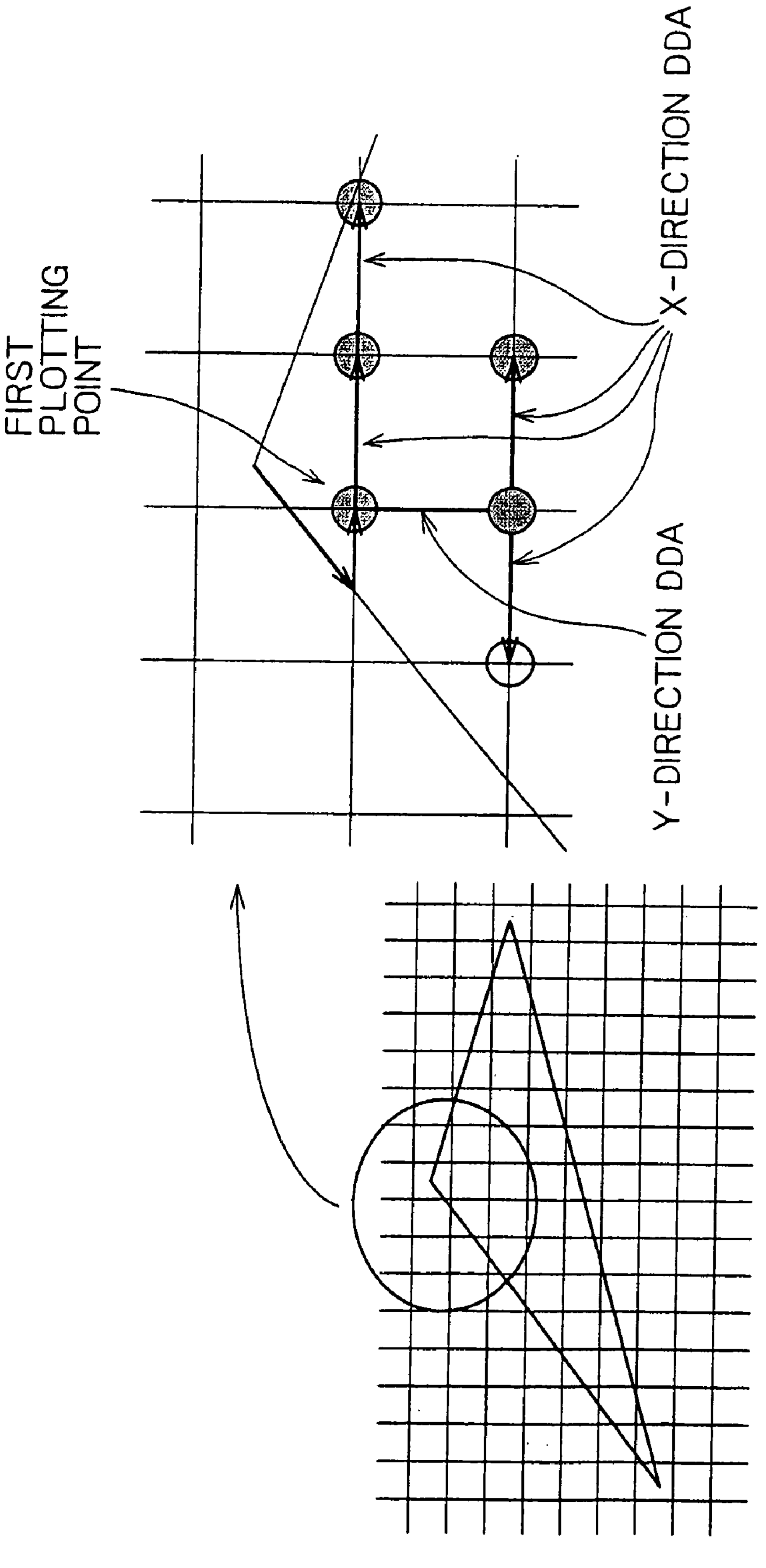
FIG. 5 is a diagrammatic view illustrating a function of the triangle DDA circuit shown in FIG. 1.

The triangle DDA circuit 144 calculates linearly interpolated (z, R, G, B, s, t, q) data of each of the pixels in the inside of the triangle using the variation data S143 inputted thereto from the DDA setup circuit 143. The triangle DDA circuit 144 outputs (x, y) data of the pixels and the (z, R, G, B, s, t, q) data at the (x, y) coordinates as DDA data (interpolation data) S144 to the texture engine circuit 145. For example, the triangle DDA circuit 144 outputs DDA data S144 for 8 (=2×4) pixels positioned in a rectangle to be processed parallelly to the texture engine circuit 145. The function of the triangle DDA circuit 144 is further described with reference to FIG. 5.

As described hereinabove, the DDA setup circuit 143 in the preceding stage prepares first values at a plotting start point of a triangle and inclination information of the above-described various kinds of information in the horizontal direction (X direction) and the vertical direction (Y direction). It is a basic process of the triangle DDA circuit 144 to determine values on integer gratings included in the inside of a given triangle, and the entity of the process is multiplication between the integer distance from the plotting start point and the inclination.

Actually, if the object of the processing is advanced by one pixel distance in the horizontal direction and the inclination in the horizontal direction is added, then the value at the position advanced by one pixel distance is determined. Therefore, contents of the calculation are an addition process of a fixed value rather than such multiplication as mentioned above.

Texture Engine Circuit 145

The texture engine circuit 145 performs calculation processing of "s/q" and "t/q", calculation processing of texture coordinate data (u, v), reading out processing of (R, G, B) data from a texture buffer 149*a* and other necessary processing in accordance with a pipeline method. The texture engine circuit 145 performs processing, for example, for 8 pixels positioned in a predetermined rectangle parallelly and simultaneously.

The texture engine circuit 145 performs arithmetic operation of dividing the s data by the q data and dividing the t data by the q data of the (s, t, q) data represented by the DDA data S144. The texture engine circuit 145 includes, for example, 8 dividing circuits not shown and performs the divisions "s/q" and "t/q" of 8 pixels simultaneously. The texture engine circuit 145 may be mounted otherwise so that interpolation arithmetic operation processing from a representative point from among 8 pixels may be performed. Further, the texture engine circuit 145 multiplies the division results "s/q" and "t/q" by the texture sizes USIZE and VSIZE, respectively, to produce texture coordinate data (u, v).

Further, the texture engine circuit 145 outputs a read request including the produced texture coordinate data (u, v) to the SRAM 150 or the DRAM 149 through the memory I/F circuit 146. Consequently, the texture engine circuit 145 reads out the texture data stored in the SRAM 150 or the texture buffer 149*a* included in the DRAM 149 through the memory I/F circuit 146 to acquire (R, G, B) data S150 stored at the texture address corresponding to the (s, t) data.

The texture data stored in the texture buffer 149*a* are stored in the SRAM 150 as described hereinabove. The texture engine circuit 145 performs multiplication or some other suitable arithmetic operation of the (R, G, B) data of the read out (R, G, B) data S150 and the (R, G, B) data included in the DDA data S144 from the triangle DDA circuit 144 in the preceding stage to produce pixel data S145. The texture engine circuit 145 finally outputs the pixel data S145 as a color value of the pixel to the memory I/F circuit 146.

The texture buffer 149*a* has stored therein texture data which correspond to a number of reduction ratios such as MIPMAP (plural-resolution textures). Texture data of which one of the reduction ratios should be used is determined in a unit of a triangle using a predetermined algorithm. Where a full color display system is used, the texture engine circuit 145 directly uses the (R, G, B) data read out from the texture buffer 149*a*.

On the other hand, where an index color display system is used, the texture engine circuit 145 transfers data of a color index table produced in advance to a temporary storage buffer formed from an SRAM or the like built therein from a texture color lookup table (CLUT) buffer 149*d* and uses the color lookup table to obtain (R, G, B) data corresponding to the color index read out from the texture buffer 149*a*. For example, where the color lookup table is formed from an SRAM, if a color index is inputted to an address of the SRAM, then actual (R, G, B) data appear at an output of the SRAM.

Here, a texture mapping process is described with reference to FIGS. 6 and 7*a* to 7*c*.

Figure 6:
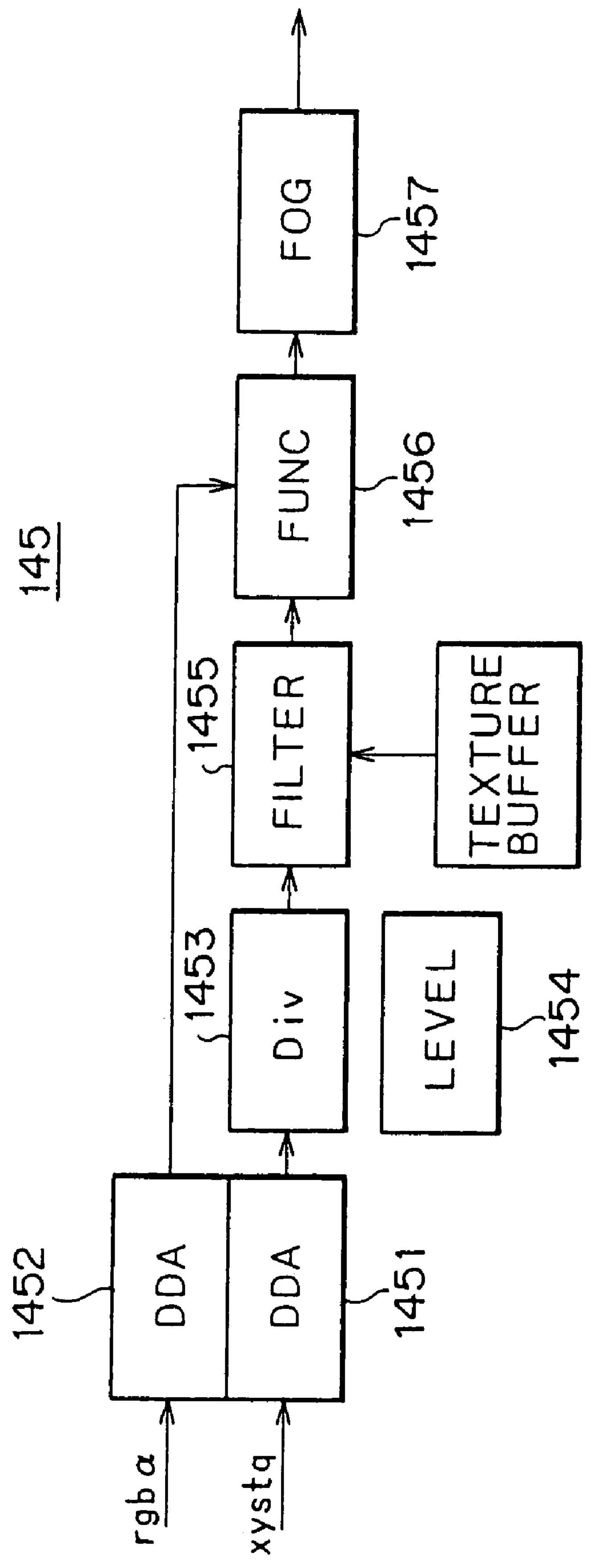
FIG. 6 is a block diagram showing an example of a construction of a texture mapping processing circuit of a texture engine circuit shown in FIG. 1.
Figures 7A, 7B, 7C:
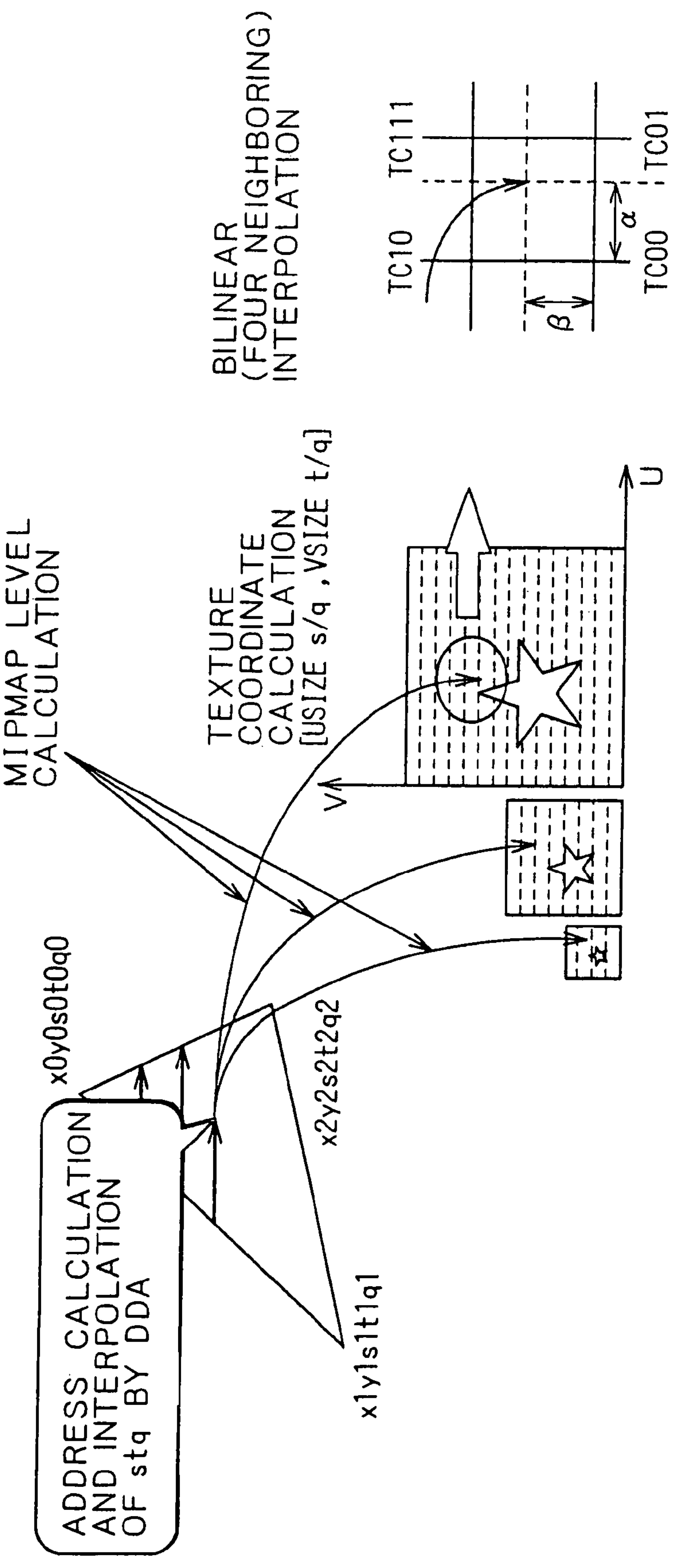
FIGS. 7A to 7C are diagrammatic views illustrating operation of the texture mapping processing circuit of FIG. 6.

FIG. 6 shows an example of a construction of the texture mapping processing circuit of the texture engine circuit 145, and FIGS. 7*a* to 7*c* illustrate an actual texture mapping process. Referring first to FIG. 6, the texture mapping processing circuit 145 shown includes a pair of DDA circuits 1451 and 1452, a texture coordinate calculation circuit (Div) 1453, a MIMMAP level calculation circuit 1454, a filter circuit 1455, a first synthesis circuit (FUNC) 1456, and a second synthesis circuit (FOG) 1457. In the texture mapping processing circuit 145, each of the DDA circuits 1451 and 1452 converts homogeneous coordinates s, t, q of the texture obtained by linear interpolation in the inside of a triangle into an actual address of the texture on a Cartesian coordinate system (division by q) as seen in FIG. 7*a*.

Where MIPMAP or the like is involved, the MIMMAP level calculation circuit 1454 calculates the level of the MIPMAP. Then, the texture coordinate calculation circuit 1453 calculates texture coordinates as seen in FIG. 7*b*. Further, the filter circuit 1455 reads out the texture data of the individual levels from the texture buffer included in the DRAM 149 and performs point sampling, in which the texture data are used as they are, bilinear (four neighboring) interpolation, trilinear interpolation and so forth.

The following processing is performed for a texture color obtained by the filter circuit 1455. In particular, the first synthesis circuit 1456 synthesizes the inputted object color and the texture color, and the second synthesis circuit 1457 further synthesizes the synthesized color and the fog color to finally determine a color of the pixel used for plotting.

Memory I/F Circuit 146

The memory I/F circuit 146 compares z data corresponding to the pixel data S145 inputted from the texture engine circuit 145 with z data stored in a z buffer 149*c* included in the DRAM 149 to discriminate whether or not an image to be plotted with the inputted pixel data S145 is positioned forwardly of (nearer to the point of view than) the image which was written into a display buffer 149*b* in the preceding cycle. If the former image is positioned forwardly of the latter image, then the z data stored in the z buffer 149*c* is updated with the z data corresponding to the image data S143.

Further, the memory I/F circuit 146 writes the (R, G, B) data into a display buffer 147*b*. Furthermore, the memory I/F circuit 146 calculates a memory block in which texture data corresponding to a texture address of a pixel to be plotted next is stored from its texture address and issues a read request only to the memory block to read out the texture data. In this instance, since any memory block in which the pertaining texture data is not stored is not accessed for reading out of texture data, a longer access time can be allocated to the plotting. Also upon plotting, the memory I/F circuit 146 similarly issues a read request to a memory block, in which pixel data corresponding to an address of a pixel to be plotted next is stored, to read out the pixel data from the address and modifies and writes the pixel data back into the same address. When invisible face processing is to be performed, the memory I/F circuit 146 similarly issues a read request to a memory block, in which depth data corresponding to an address of a pixel to be processed next is stored, to read out the depth data from the address and modifies and writes the depth data back into the same address.

Further, the memory I/F circuit 146 reads out the (R, G, B) data S150 stored in the SRAM 150 when it receives a read request including the produced texture coordinate data (u, v) from the texture engine circuit 145. Furthermore, the memory I/F circuit 146 reads out, when it receives a request to read out display data from a CRT control circuit 147, display data in a fixed united set, for example, in a unit of a fixed number of pixels 8 pixels or 16 pixels, from the display buffer 149*b* in response to the request.

The memory I/F circuit 146 performs accessing to (writing into or reading out from) the DRAM 149 and the SRAM 150 and has a write path and a read path separate from each other. In particular, for writing, a write address ADRW and write data DTW are processed by a writing system circuit and writing into the DRAM 149 is performed. On the other hand, upon reading out, the address is processed by the reading system circuit and reading out from the DRAM 149 or the SRAM 150 is performed.

The memory I/F circuit 146 performs accessing to the DRAM 149 based on addressing of a predetermined interleave system, for example, in a unit of 16 pixels. Since such transfer of data to and from a memory is performed parallelly in a number of systems, an augmented plotting performance is obtained.

Particularly, either by providing the triangle DDA part and the texture engine part as same circuits (spatially parallelly) in a parallel effective form or by inserting pipelines finely (temporally parallelly), simultaneous calculation for a number of pixels is performed. Since adjacent memory blocks in the display area are arranged such that they may be different memory blocks from each other as hereinafter described, where such a plane as a triangle is to be plotted, since they can be processed simultaneously on the plane, the operation probabilities of the individual memory blocks are very high.

CRT Control Circuit 147

The CRT control circuit 147 generates a display address for displaying on a CRT not shown in synchronism with horizontal and vertical synchronizing signals given thereto and outputs a request to read out display data from the display buffer 149*b* included in the DRAM 149 to the memory I/F circuit 146. In response to the request, the memory I/F circuit 146 reads out display data in a fixed amount from the display buffer 149*b*. The CRT control circuit 147 has built therein typically a FIFO circuit for storing the display data read out from the display buffer 149*b* and outputs an RGB index value at fixed time intervals to the RAMDAC Circuit 148.

RAMDAC Circuit 148

The RAMDAC circuit 148 has stored therein R, G, B data corresponding to individual index values and transfers digital R, G, B data corresponding to the RGB index value inputted thereto from the CRT control circuit 147 to a D/A converter (Digital/Analog converter) not shown so that analog R, G, B data are produced by the D/A converter. The RAMDAC circuit 148 outputs the produced R, G, B data to the CRT.

DRAM 149

The DRAM 149 functions as the texture buffer 149*a*, display buffer 149*b*, z buffer 149*c* and texture CLUT (Color Look Up Table) buffer 149*d*. The DRAM 149 is divided in a number of (four in the embodiment) modules having the same function as hereinafter described. In order to allow a greater amount of texture data to be stored in the DRAM 149, indices to index colors and color lookup table values for them are stored in the texture CLUT buffer 149*d*.

The indices and the color lookup table values are used in texture processing as described hereinabove. In particular, normally a texture element is represented with totaling 24 bits composed of 8 bits individually for R, G, B. This, however, makes the data amount great. Therefore, one color is selected from among, for example, 256 colors selected in advance, and the data of the color is used for texture processing. Therefore, where 256 colors are involved, each texture element can be represented with 8 bits. While a conversion table from an index to an actual color is required, as the resolution of the texture increases, the texture data can be made more compact. This allows compression of texture data and efficient utilization of the built-in DRAM. Further, in order to allow invisible face processing to be performed simultaneously and parallelly with plotting, depth information of the object to be plotted is stored in the DRAM 149.

It is to be noted that display data, depth data and texture data may be stored in such a manner that, for example, the display data are stored successively beginning with a predetermined position such as, for example, the top, of a memory block and are followed by the depth data, and then the texture data are stored in the remaining area in which they are stored in successive address spaces for the individual types of the textures.

Figure 8C:
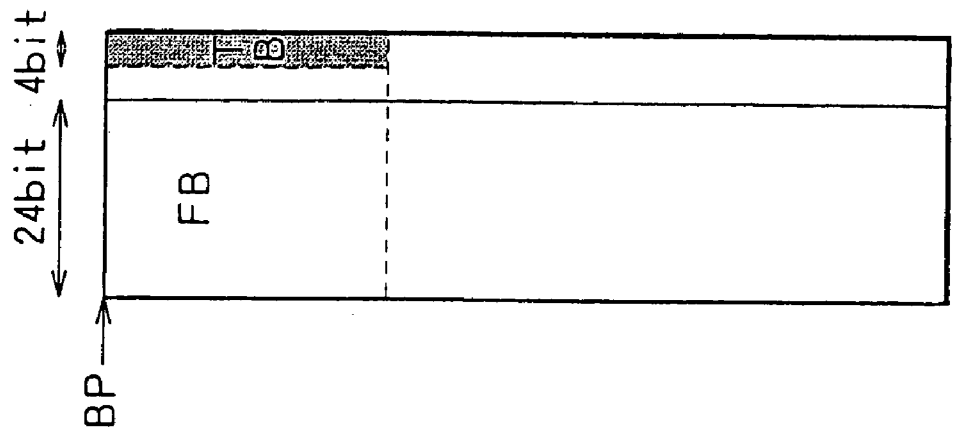
FIGS. 8A to 8C are diagrammatic views schematically illustrating a storage method of display data, depth data, and texture data into a DRAM shown in FIG. 1.
Figure 8B:
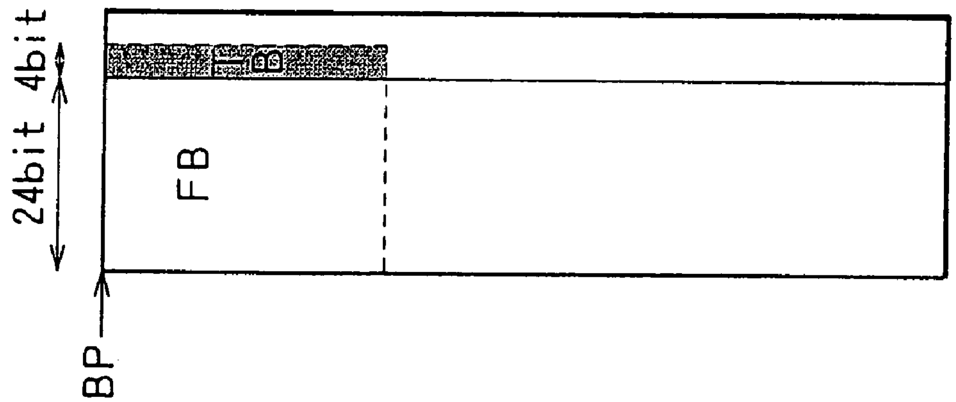
Figure 8A:
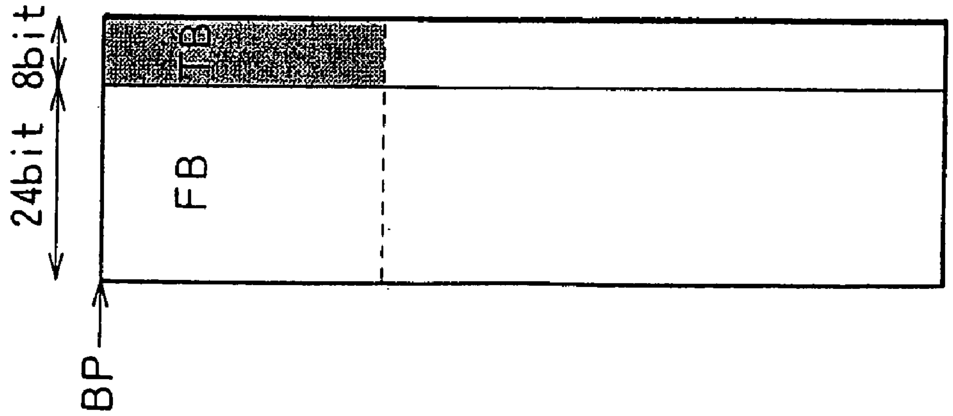

A concept of this is described with reference to the drawings. Referring to FIGS. 8*a* to 8*c*, display data and depth data are stored, for example, with the width of 24 bits each in a region denoted by FB beginning with the position indicated by a base pointer (BP), and texture data are stored as denoted by TB in the remaining free area of the 8-bit width. They are considered to be conversion of display data and texture data into unified memories. This allows texture data to be stored efficiently. Through such predetermined processing of the DDA setup circuit 143, triangle DDA circuit 144, texture engine circuit 145, memory I/F circuit 146 and so forth as described above, final memory accessing is performed in a unit of a plotting pixel (picture cell element).

In order to perform such processing as described above, blocks corresponding to the individual logical functions are formed and arranged in such a positional relationship as shown in a layout view of FIG. 2. Referring to FIG. 2, the host I/F 141 for transfer of data to and from an external circuit is arranged on one side of the logic circuit blocks.

This allows minimization of the dispersion and the maximum length of wiring lines from the host I/F 141 to the processing blocks.

The input buffer 142 for input apex data and so forth is arranged adjacent the host I/F 141. Arranged adjacent the input buffer 142 is an initialization arithmetic operation block for linear interpolation operation, that is, the DDA setup circuit 143. This arrangement minimizes the dispersion of wiring lines for extraction of inputted apex data and allows data transfer of the limit to the semiconductor performance. Arranged adjacent the DDA setup circuit 143 which is an initialization arithmetic operation block for linear interpolation operation is the triangle DDA circuit 144 as a linear interpolation processing block.

Since texture processing for applying a pattern to a graphic form in three-dimensional graphics plotting is performed immediately after the linear interpolation operation processing, in order to optimize the transfer path, the texture engine circuit 145 and the memory I/F circuit 146 which are texture processing blocks are arranged adjacent the triangle DDA circuit 144 as a linear interpolation operation processing block.

A memory block (A, B) which can sufficiently store display data has an area greater than one half the area of a chip and is very great in almost all cases. This makes the length itself of wiring lines between the display buffer and a block for graphics processing comparatively long and makes the dispersion in length comparatively great.

Therefore, such a system configuration as shown in FIG. 2 is employed wherein the registers 151 and 152 whose operation cannot be controlled from a block which performs graphics processing can be inserted or arranged on one or both of the input side and the output side of the display buffer. This system configuration allows the delay time of a wiring line, which is long and delays signal conversion, to be fixed within a fixed range and allows augmentation of the performance of the entire system.

Further, the memory block having a capacity sufficient to store display data is formed such that it has two or more ports. Although this increases the size of the memory block itself, the transfer performance of the memory block can be augmented.

Particularly in three-dimensional graphics plotting, since writing into the display memory, reading out from the texture memory which is physically same as the display memory and reading out from the display memory for displaying can be performed simultaneously and parallelly, the performance of the entire system can be augmented. In the present embodiment, first ports 153 and 154 are provided as data input/output ports for the memory blocks A and B, respectively, and second ports 155 and 156 are provided as read-only ports for the memory blocks A and B, respectively, as seen in FIG. 2.

It is to be noted that, while, in the arrangement shown in FIG. 2, the registers 151 and 152 whose operation cannot be controlled are arranged on the data output sides of the read-only ports, it may otherwise be effective to arrange them on the write data line side or for both of read and write address lines inputted to the memory blocks. The arrangement depends upon the sizes or the wiring line relationship of the memory blocks and the logic blocks.

Further, in the present embodiment, a FIFO (First In First Out) buffer is arranged on the receiving side of a bus between circuit blocks which are physically separate from each other so that transfer of data from the data signaling side can be stopped from the data receiving side using a signal informing that it is estimated that the FIFO will be fully occupied soon. Employment of the construction just described allows insertion of a pipe into a control signal between the circuit blocks and augmentation of the operation frequency of the entire system.

When such three-dimensional graphics processing as described above is performed, in order to prevent the sizes of the initialization arithmetic operation block for linear interpolation operation and the linear interpolation processing block. That is, the DDA setup circuit 143 and the triangle DDA circuit 144, from becoming greater than the block size of the texture processing system block, contents of processing by the initialization arithmetic operation block and the linear interpolation processing block are selected severely. In this connection, since the main plotting element is a triangle, contents whose processing efficiency is augmented particularly in regard to plotting of a triangle are described.

The DDA setup circuit 143 which is the initialization arithmetic operation block first performs sorting of apexes of triangles with the coordinate in the y-axis direction so as to minimize the number of different shapes to be processed. Further, the DDA setup circuit 143 mathematically calculates the inclinations of the various parameters (Z, R, G, B, S, T, Q, α, F and so forth) in the inside of a triangle with respect to the X-axis and Y-axis directions in the plane.

Figure 9:
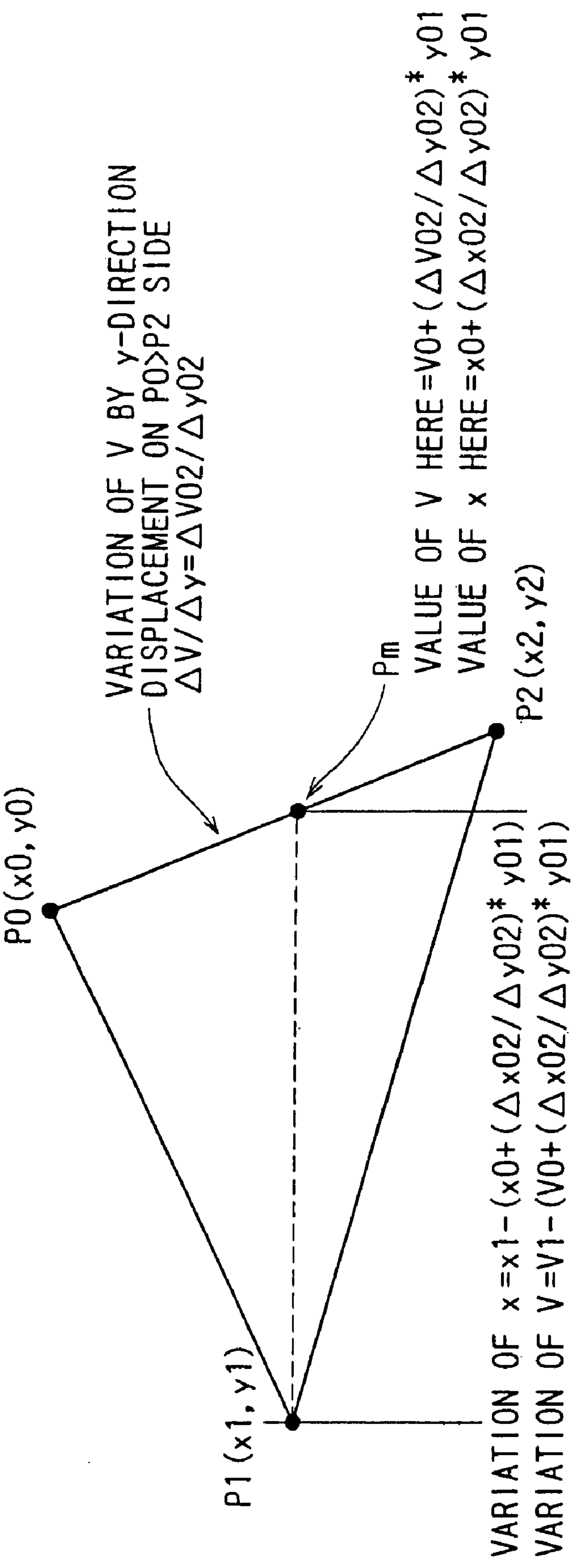
FIG. 9 is a diagrammatic view illustrating a process for determining a gradient of a triangle in a DDA process by the system of FIG. 1.

More particularly, the variation ΔV/Δy of V in the y-direction displacement on the side of the apexes P0→P2 in FIG. 9 is given by the following expression:

$$\Delta V/\Delta y=\Delta V\mathbf{02}/\Delta y\mathbf{02} \tag{1}$$

The variation Δx of x and the variation ΔV of the parameter V at the apex P1 are given by the following expressions (2) and (3), respectively:

$$\Delta x=(x\mathbf{1}-(x\mathbf{0}+(\Delta x\mathbf{02}/\Delta y\mathbf{02})*y\mathbf{01}) \tag{2}$$

$$\Delta V=(V\mathbf{1}-(V\mathbf{0}+(\Delta V\mathbf{02}/\Delta y\mathbf{02})*y\mathbf{01}) \tag{3}$$

Therefore, the inclination ΔV/Δx of the parameter V with respect to the x-axis direction is given by the following expression:

$$\begin{aligned}\Delta V/\Delta x &= (V1-(V0+(V02/\Delta y02)*y01)/\\ &\quad ((x1-(x0+(\Delta x02/\Delta y02)*y01))\\ &= (\Delta V01-(\Delta V02/\Delta y02)*\Delta y01)/\\ &\quad (\Delta x01-(\Delta x02/\Delta y02)*\Delta y01) \quad \text{where}\\ \Delta V01 &= V1-V0.\end{aligned} \tag{4}$$

Further, the denominator and the numerator of the expression (4) are multiplied by Δy02 to obtain the following expression (5):

$$\Delta V/\Delta x=(\Delta V\mathbf{01}*\Delta y\mathbf{02}-\Delta y\mathbf{01}*\Delta V\mathbf{02})/(\Delta x\mathbf{01}*\Delta y\mathbf{02}-\Delta y\mathbf{01}*\Delta x\mathbf{02}) \tag{5}$$

Similarly, a normal line is formed from the apex P0 to the side P1–Pm, and a variation of the parameter V at the intersecting point is determined. Consequently, the inclination of the parameter V with respect to the y-axis direction is given by the following expression:

$$\Delta V/\Delta y=(\Delta V\mathbf{01}*\Delta x\mathbf{02}-\Delta x\mathbf{01}*\Delta V\mathbf{02})/(\Delta x\mathbf{01}*\Delta y\mathbf{02}-\Delta y\mathbf{01}*\Delta x\mathbf{02}) \tag{6}$$

It is to be noted that the denominators of the expressions (5) and (6) are the outer product of the vector P0→P1 (x1–x0, y1–y0) and the vector P0→P2 (x2–x0, y2–y0).

By mathematically calculating the inclinations with respect to the X-axis and Y-axis directions in such a manner as described above, an inclination in the plane can be calculated without classifying results of sorting of triangles. With regard to the direction in which plotting is to be performed, the plotting direction in the X direction is determined so that the side which is longest in the Y-axis direction is set as a starting side and any other side is set as an ending side.

Figure 10:
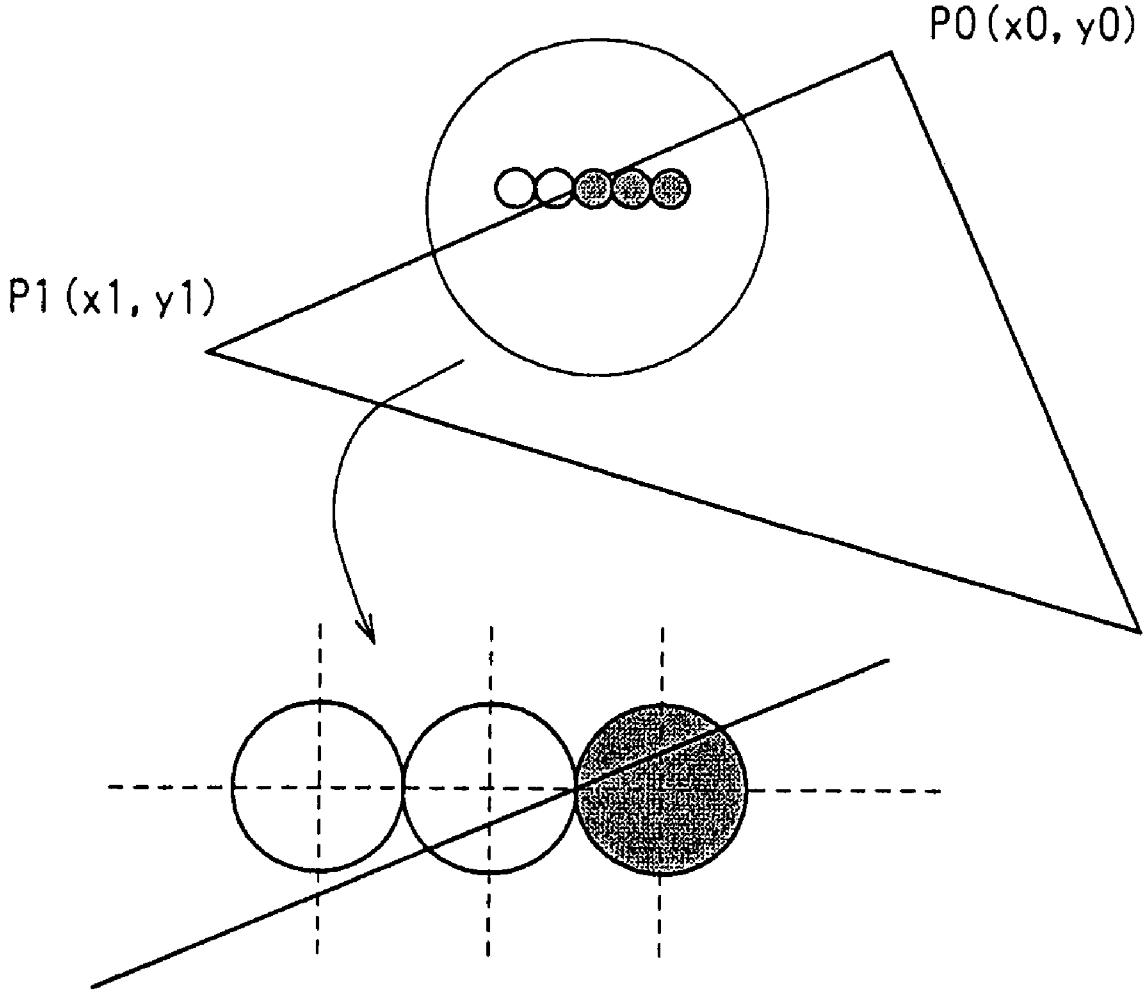
FIG. 10 is a diagrammatic view illustrating an inside/outside discrimination process of pixels in the DDA process by the system of FIG. 1.

Discrimination of whether or not a point is in the inside of an object triangle is performed in the following manner so that the discrimination may be performed through arithmetic operation as simple as possible. For example, if end points of a straight line which interconnects two apexes of a given triangle are represented by (x0, y0) and (x1, y1) as seen in FIG. 10, then the straight line is given by the following equation:

$$f(x, y)=(y1-y0)(x-x0)+(x0-x1)(y-y0) \quad (7)$$

If this f(x, y) is determined and the sign of the solution is checked, then it can be discriminated whether or not the point is on the right or the left with respect to the particular side of the triangle. If this process is executed with regard to the three sides which form the triangle, then it can be discriminated whether the point is within or without the triangle.

Further, since the function f(x, y) is a linear expression with regard to x and y, it can be arithmetically operated using the DDA technique, and once a point in the inside of the triangle is determined, f(x, y) regarding a next adjacent point can be calculated through addition arithmetic operation processing of a fixed value.

Figure 11:
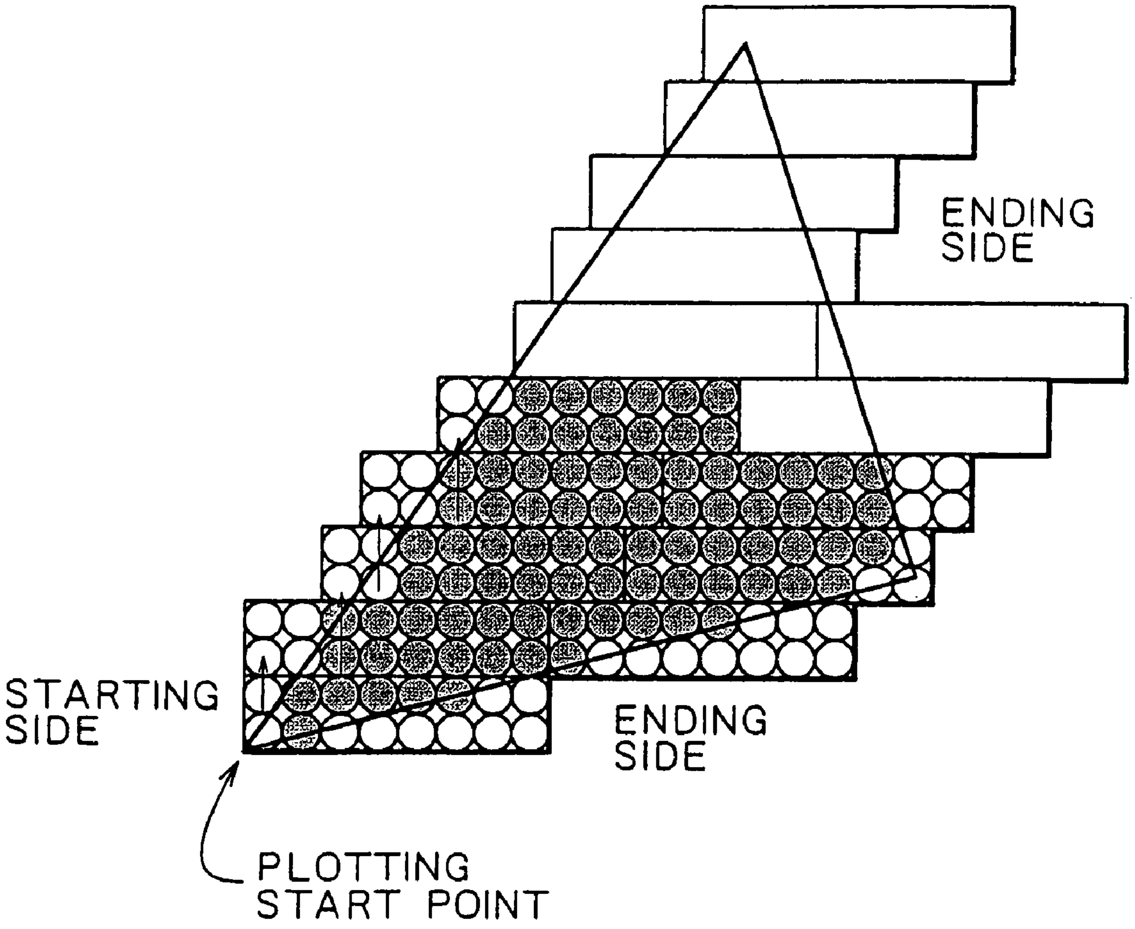
FIG. 11 is a diagrammatic view illustrating a 2×8 moving stamping process by the system of FIG. 1.

The DDA technique makes use of the following scheme to decrease the arithmetic operation amount.

f(x, y) can be calculated through such arithmetic operation as increase by $(y1-y0)$ with $x=x+1$ increase by $(x0-x1)$ with $y=y+1$ In the DDA processing of the present embodiment, 2×8 moving stamping is performed wherein processing of pixels is performed for a fixed range (2×8) and the range of processing is set independently of the boundary of a page even where the display memory is a DRAM. For example, a first internal pixel is calculated first, and then a stamp of 2×8 pixels is plotted as seen in FIG. 11. At this time, a plotting mask is produced through a pixel inside/output discrimination. Then, the first inside pixel position in the x direction is stored, and 2×8 stamp plotting is continued till the ending side. Further, stamping is started at the x position stored in advance for the position in the y direction advanced by one stamp distance.

Employment of such moving stamping processing can reduce processing for unnecessary pixels which are not actually plotted and can thus reduce the circuit scale for achieving the object performance. Where such simple processing as described above is performed in processing of data until the data processing comes to the texture processing block, construction of the block in a scale smaller than that of the texture processing block is allowed.

Further, wiring to the individual blocks can be performed reasonably, and the architecture of the entire system is constructed so that the sizes of the initialization arithmetic operation block for linear interpolation operation and the linear interpolation processing block may not become greater than that of the texture processing block. In particular, in the present embodiment, the architecture of the entire system is constructed so that the sizes of the blocks of the DDA setup circuit 143 and the triangle DDA circuit 144 may not become greater than that of the texture processing system including the texture engine circuit 145 and the memory I/F circuit 146.

Further, it is significant that, since the texture processing involves frequent accessing to a memory of a large capacity, the portion therefor can be arranged at the center of a chip as far as possible, and also in order that data processing blocks up to the texture processing may be arranged well and besides the texture processing block can be arranged substantially at a central position of a chip, the data processing blocks till the texture processing are smaller than the texture processing block. Subsequently, an example of a detailed construction of the DRAM 149, the SRAM 150 and the memory I/F circuit 146 which accesses DRAM 149 and SRAM 150 described hereinabove is described with reference to the drawings.

Figure 12:
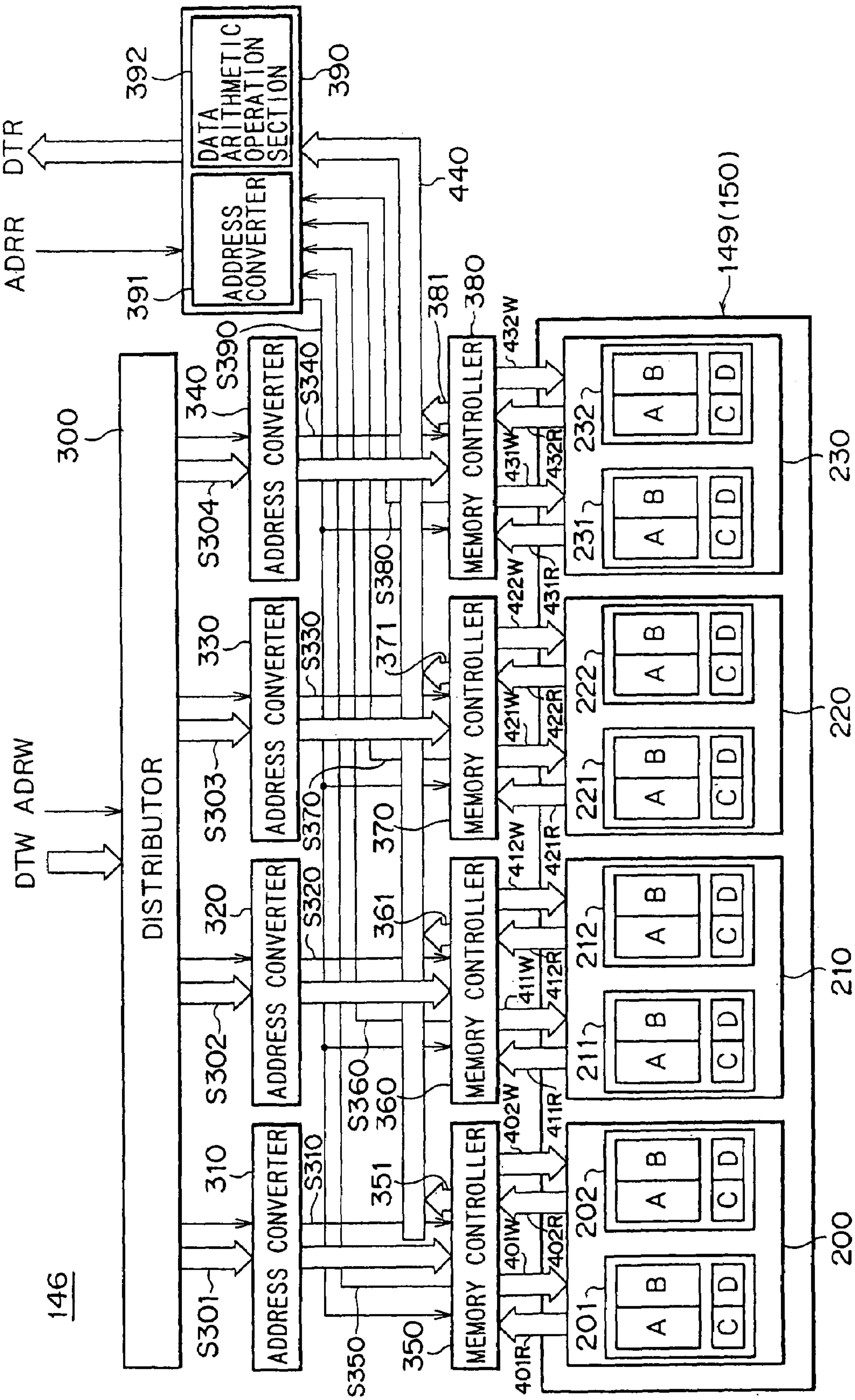
FIG. 12 is a block diagram showing an example of a particular construction of a DRAM and an SRAM in the rendering circuit and a memory I/F circuit which accesses the DRAM and the SRAM in the system of FIG. 1.

Referring to FIG. 12, the DRAM 149 and the SRAM 150 are each divided into four memory modules 200, 210, 220 and 230.

The memory module 200 includes a pair of memories 201 and 202. The memory 201 includes a pair of banks 201A and 201B which form part of the DRAM 149, and another pair of banks 201C and 201D which form part of the SRAM 150. The memory 202 includes a pair of banks 202A and 202B which form part of the DRAM 149 and another pair of banks 202C and 202D which form part of the SRAM 150. It is to be noted that the banks 201C, 201D, 202C and 202D which form the SRAM 150 can be accessed simultaneously.

The memory module 210 includes a pair of memories 211 and 212. The memory 211 includes a pair of banks 211A and 211B which form part of the DRAM 149 and another pair of banks 211C and 211D which form part of the SRAM 150. The memory 212 includes a pair of banks 212A and 212B which form part of the DRAM 149 and another pair of banks 212C and 212D which form part of the SRAM 150. It is to be noted that the banks 211C, 211D, 212C and 212D which form the SRAM 150 can be accessed simultaneously.

The memory module 220 includes a pair of memories 221 and 222. The memory 221 includes a pair of banks 221A and 221B which form part of the DRAM 149 and another pair of banks 221C and 221D which form part of the SRAM 150. The memory 222 includes a pair of banks 222A and 222B which form part of the DRAM 149 and another pair of banks 222C and 222D which form part of the SRAM 150. It is to be noted that the banks 221C, 221D, 222C and 222D which form the SRAM 150 can be accessed simultaneously.

The memory module 230 has a pair of memories 231 and 232. The memory 231 has a pair of banks 231A and 231B which form part of the DRAM 149, and another pair of banks 231C and 231D which form part of the SRAM 150. The memory 232 has a pair of banks 232A and 232B which form part of the DRAM 149 and another pair of banks 232C and 232D which form part of the SRAM 150. It is to be noted that the banks 231C, 231D, 232C and 232D which form the SRAM 150 can be accessed simultaneously.

Each of the memory modules 200, 210, 220 and 230 has functions of all of the texture buffer 149*a*, display buffer 149*b*, z buffer 149*c* and texture CLUT buffer 149*d* shown in FIG. 1. In particular, each of the memory module 200, 210, 220 and 230 stores all of texture data, plotting data ((R, G, B) data), z data and texture color lookup table data of corresponding pixels. However, the memory module 200, 210, 220 and 230 store data regarding pixels which are different from one another.

Here, texture data, plotting data, z data and texture color lookup table data of 16 pixels to be processed simultaneously are stored in the banks 201A, 201B, 202A, 202B, 211A, 211B, 212A, 212B, 221A, 221B, 222A, 222B, 231A, 232A and 232B which are different from one another. Consequently, the memory I/F circuit 146 can simultaneously access, for example, data of 16 pixels of 2×8 pixels for moving stamping processing. It is to be noted that the memory I/F circuit 146 accesses (writes into) the DRAM 149 based on addressing of a predetermined interleave system as hereinafter described.

Figure 13A:
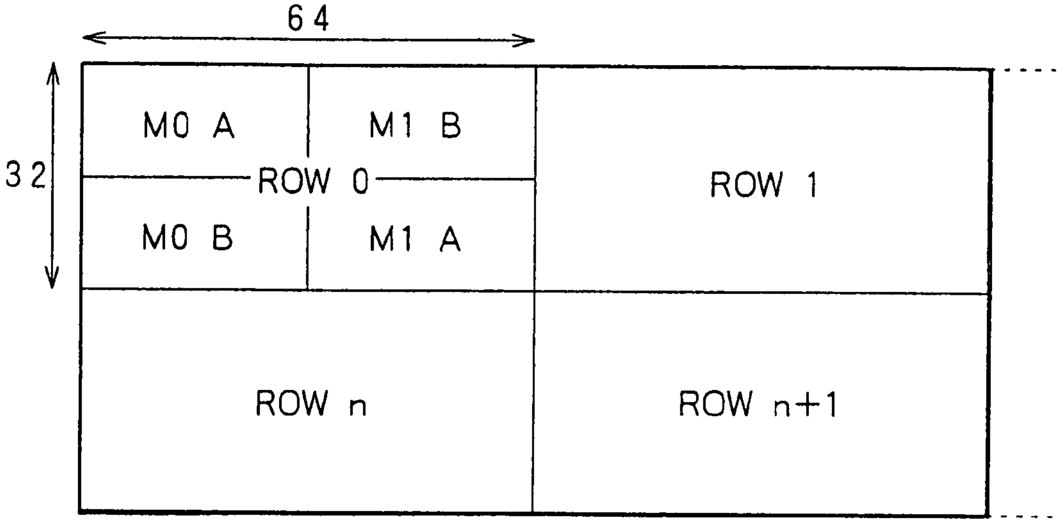
FIGS. 13A and 13B are schematic views showing an example of a construction of a DRAM buffer shown in FIG. 1.
Figure 13B:
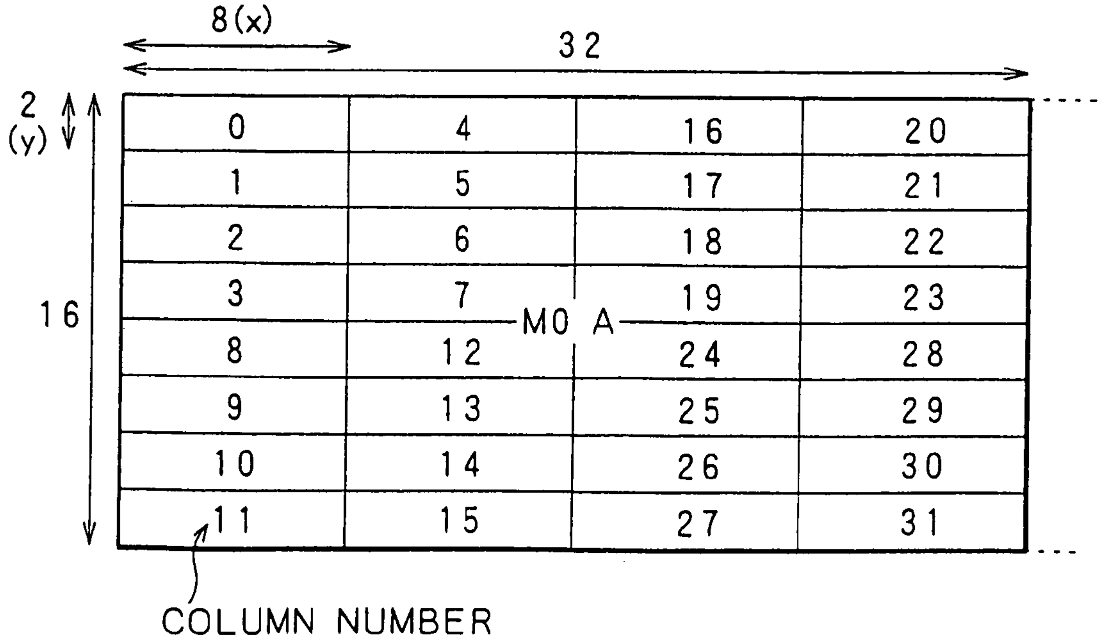

FIGS. 13*a* and 13*b* illustrate an example of a configuration of the DRAM 149 as a buffer (for example, a texture buffer). As shown in FIGS. 13*a* and 13*b*, data by memory accessing to a region of 2×8 pixels is stored in a region designated with a page (row) and a block (column). Each of rows ROW0 to ROWn+1 is sectioned into four columns (blocks) M0A, M0B, M1A, M1B as shown in FIG. 13*a*. Thus, accessing (writing, reading) is performed in a region defined by a boundary of each eight pixels in the x direction and a boundary of an even number in the y direction. Consequently, accessing to such a region which crosses, for example, the row ROW0 and the row ROW1 is not performed, and no page violation occurs at all. It is to be noted that texture data stored in the banks 201A, 201B, 202A, 202B, 211A, 211B, 212A, 212B, 221A, 221B, 222A, 222B, 231A, 231B, 232A and 232B are stored into the banks 201C, 201D, 202C, 202D, 211C, 211D, 212C, 212D, 221C, 221D, 222C, 222D, 231C, 231D, 232C and 232D, respectively.

Figure 14:
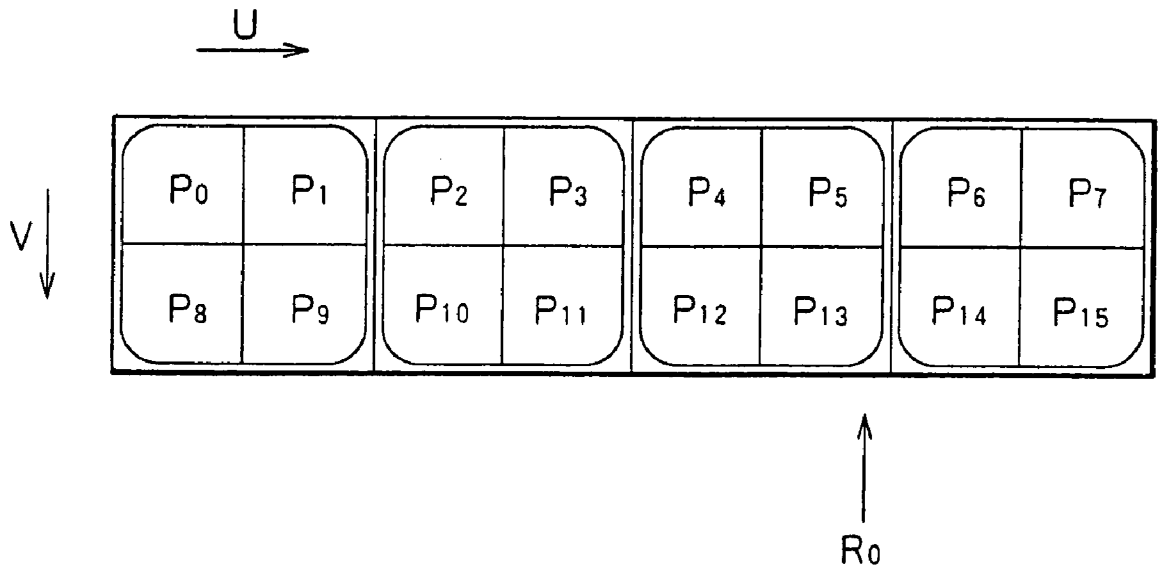
FIG. 14 is a diagrammatic view illustrating pixel data which are included in texture data and accessed simultaneously.
Figure 15:
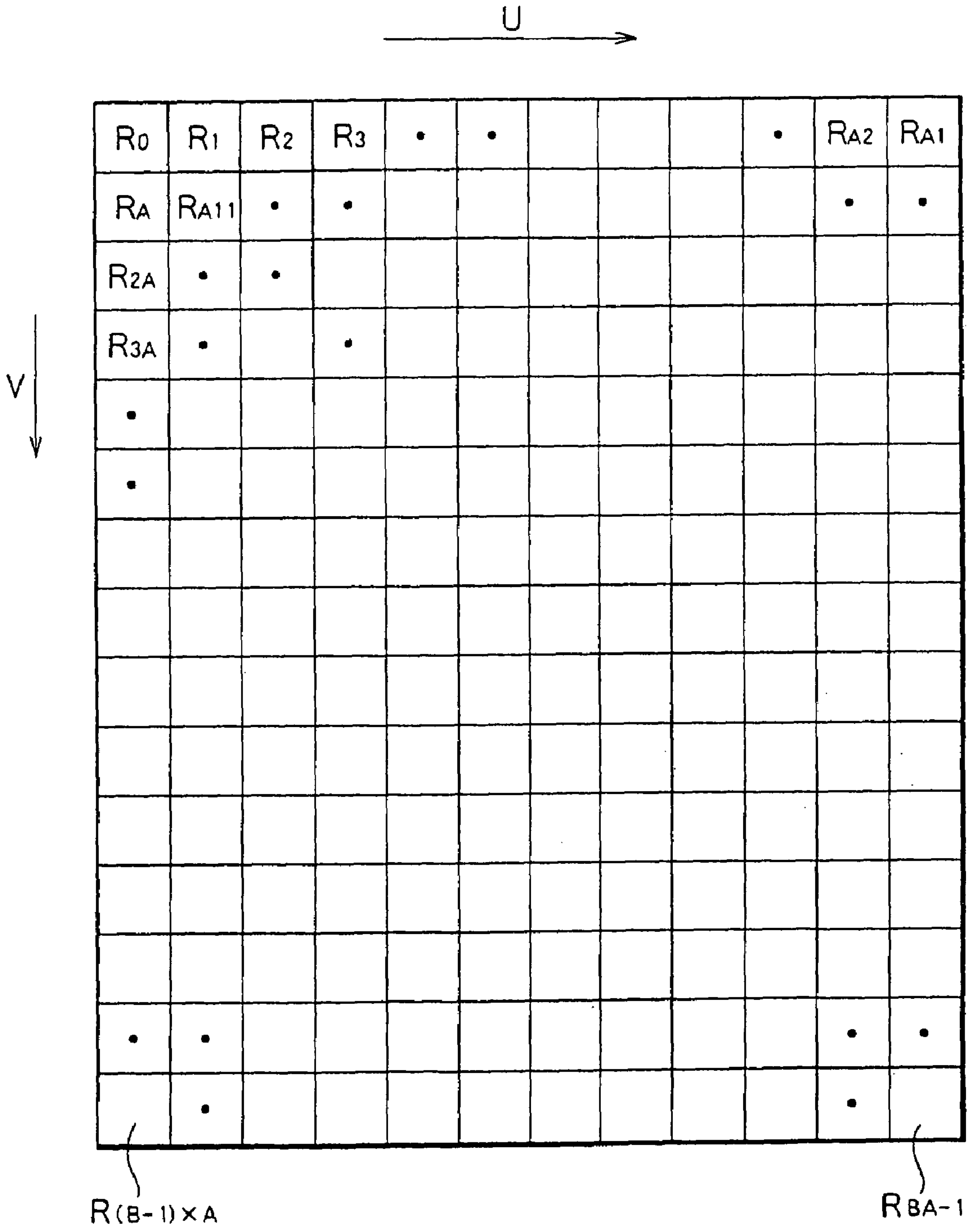
FIG. 15 is a diagrammatic view illustrating a unit block which constructs texture data.
Figure 16:
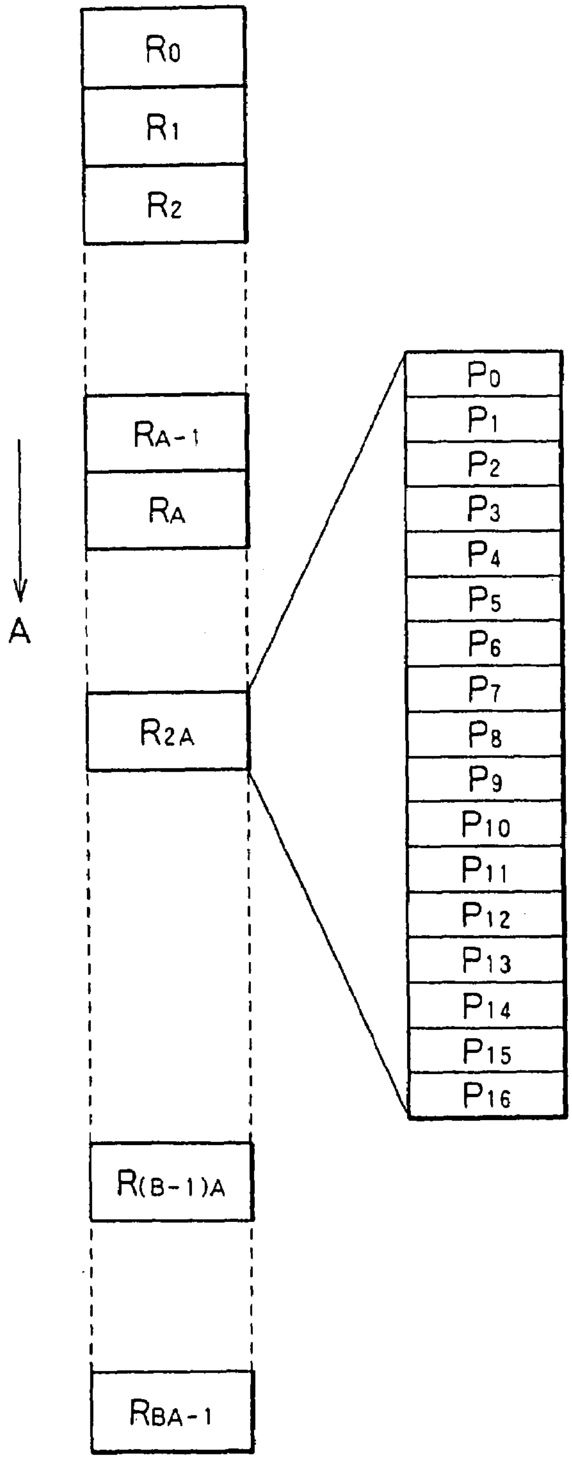
FIG. 16 is a diagrammatic view illustrating an address space of a texture buffer.

Subsequently, a storage pattern of texture data in the texture buffer 149*a* based on addressing of an interleave system is described in more detail with reference to FIGS. 14 to 16. FIG. 14 illustrates pixel data including texture data and accessed simultaneously; FIG. 15 illustrates a unit block which form texture data; and FIG. 16 illustrates an address space of the texture buffer. In the present embodiment, pixel data P0 to P15 representative of color data of pixels included in the texture data and arranged in a 2×8 matrix are accessed simultaneously. The pixel data P0 to P15 must be stored into mutually different banks of the SRAM 150 which forms the texture buffer 149*a*. In the present embodiment, the pixel data P0, P1, P8 and P9 are stored into the banks 201C and 201D of the memory 201 and the banks 202C and 202D of the memory 202 shown in FIG. 12, respectively. The pixel data P2, P3, P10 and P11 are stored into the banks 211C and 211D of the memory 211 and the banks 212C and 212D of the memory 212 shown in FIG. 12, respectively. The pixel data P4, P5, P12 and P13 are stored into the banks 221C and 221D of the memory 221 and the banks 222C and 222D of the memory 222 shown in FIG. 12, respectively. The pixel data P6, P7, P14 and P15 are stored into the banks 231C and 231D of the memory 231 and the banks 232C and 232D of the memory 232 shown in FIG. 12, respectively.

In the present embodiment, the set of pixel data P0 to P15 of pixels positioned in a rectangular area to be processed simultaneously is called unit block Ri. For example, texture data representing one image are composed of unit blocks R0 to RBA−1 arranged in a matrix of B×A as seen in FIG. 15. The unit blocks R0 to RBA−1 are stored in the DRAM 149 which forms the texture buffer 149*a* so that they may have successive addresses in a one-dimensional address space as seen in FIG. 16. Further, the pixel data P0 to P15 in the unit blocks R0 to RBA−1 are stored in mutually different banks of the SRAM 150 so that they may have successive addresses in a one-dimensional address space. In other words, unit blocks each composed of pixel data to be accessed simultaneously are stored in the texture buffer 149*a* so that they may have successive addresses in a one-dimensional address space. In the following, an example of a detailed construction of the memory I/F circuit 146 is described with reference to FIG. 12. The memory I/F circuit 146 includes a distributor 300, four address converters 310, 320, 330 and 340, four memory controllers 350, 360, 370 and 380, and a read controller 390. The distributor 300 receives, upon writing, (R, G, B) data DTW for 16 pixels and a write address ADRW as inputs thereto, divides them into four image data S301, S302, S303 and S304 each composed of data for four pixels, and outputs the image data and the write address to the address converters 310, 320, 330 and 340, respectively. Here, each of (R, G, B) data for one pixel is composed of 8 bits, and z data is composed of 32 bits. Upon writing, the address converters 310, 320, 330 and 340 convert addresses corresponding to the (R, G, B) data and the z data inputted thereto from the distributor 300 into addresses of the memory modules 200, 210, 220 and 230 and outputs the addresses S310, S320, S330 and S340 obtained by the conversion and the divided image data to the memory controllers 350, 360, 370 and 380, respectively.

Figure 17:
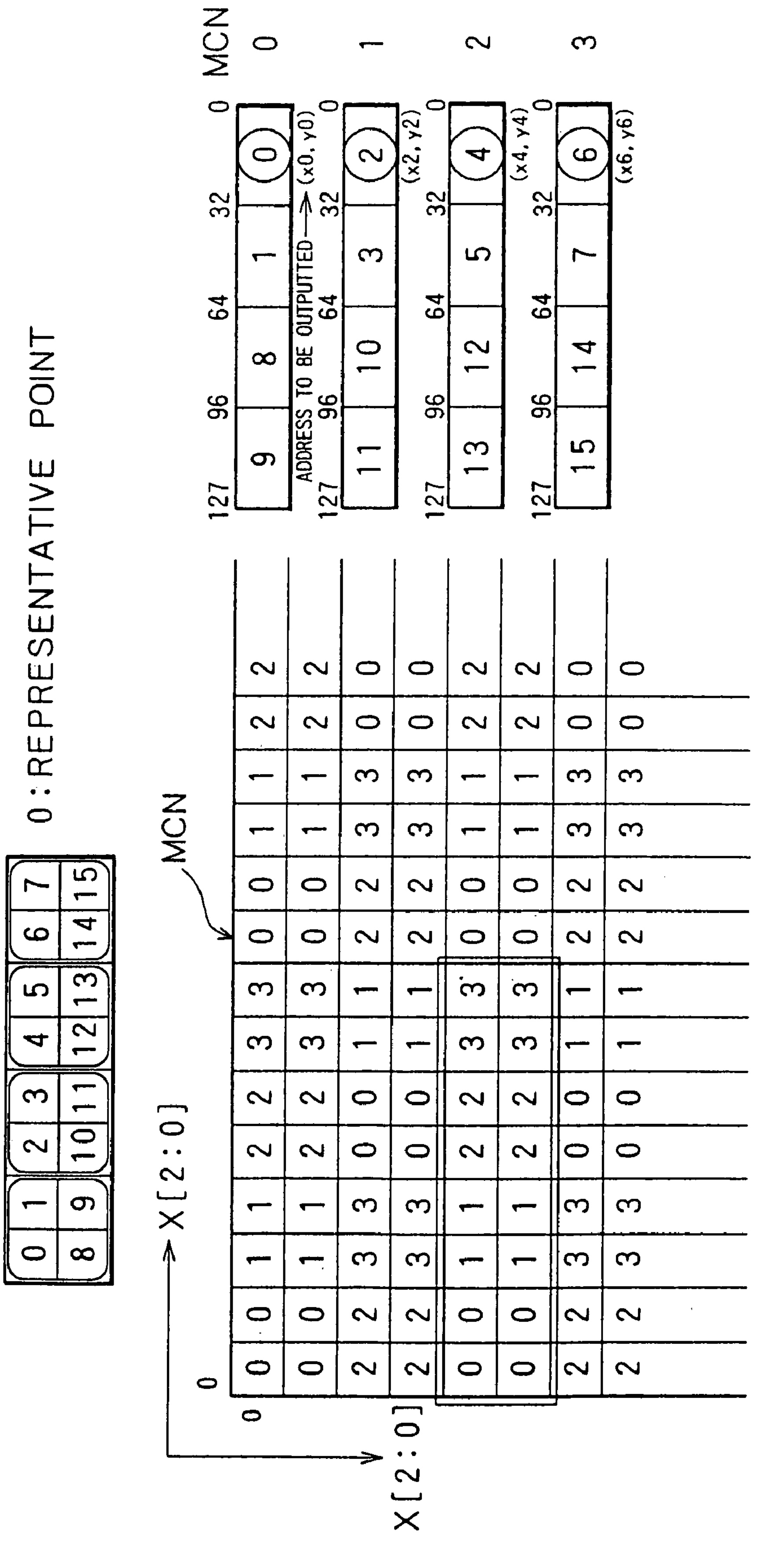
FIG. 17 is a diagrammatic view illustrating an image data process of a distributor in the memory I/F circuit of the system of FIG. 1.
Figures 18A, 18B:
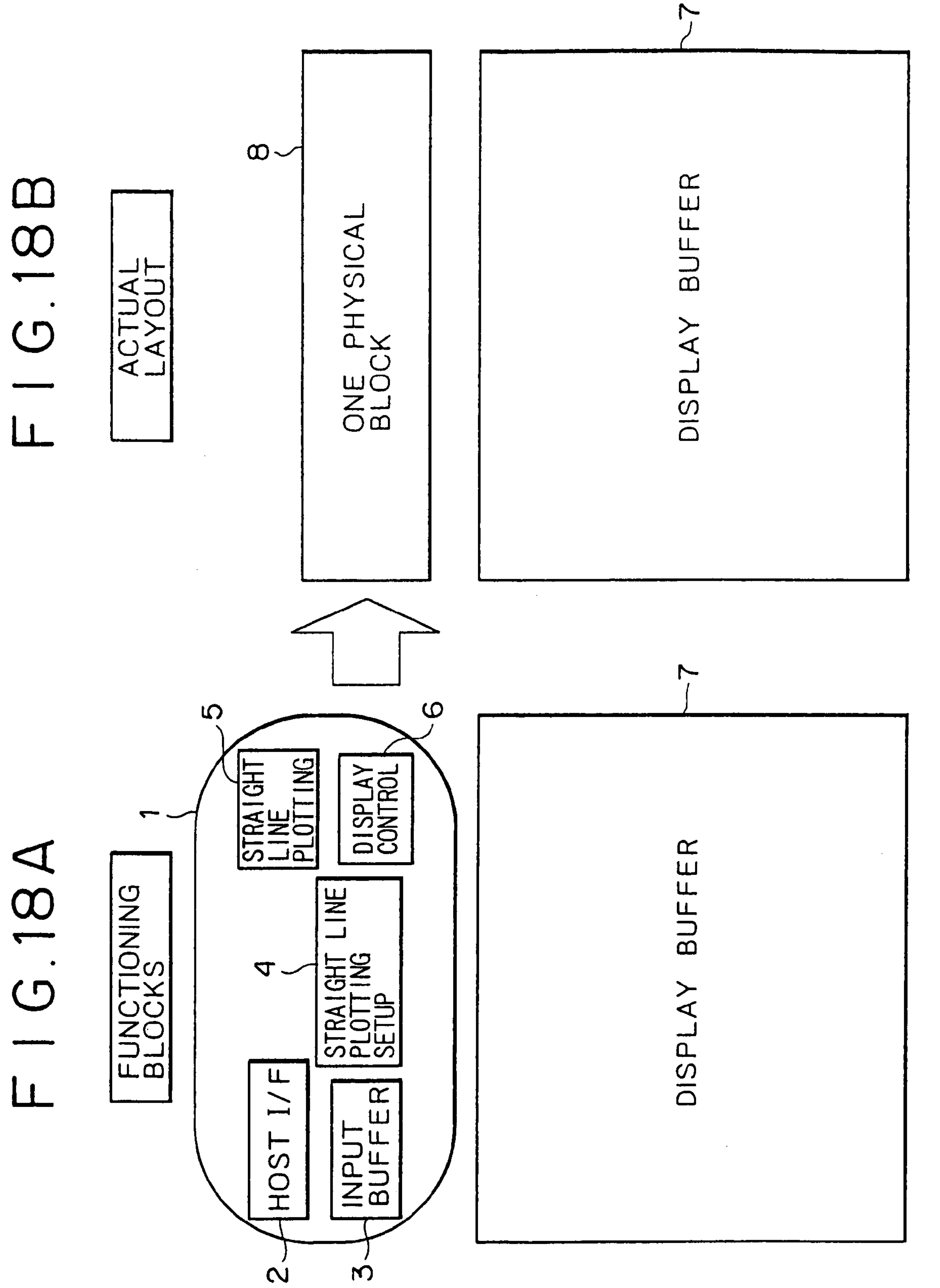
FIGS. 18A and 18B are diagrammatic views showing main functioning blocks and an actual layout of a two-dimensional graphics chip.

FIG. 17 diagrammatically illustrates image data processing (pixel processing) of the distributor 300. FIG. 17 corresponds to FIGS. 13 to 16, and the distributor 300 performs image data processing so that data of, for example, 16 pixels of a 2×8 matrix in the DRAM 149 can be accessed simultaneously. Further, the distributor 300 performs processing of image data so that accessing to (writing into and reading out from) the DRAM 149 may be performed in a region defined by a boundary of each eight pixels in the x direction and a boundary of an even number in the y direction. Consequently, the top of accessing to the DRAM 149 does not have the memory cell number MCN of “1”, “2” or “3” but has the memory cell number MCN of “0” without fail, and therefore, occurrence of page violation or the like is prevented.

Further, the distributor 300 performs processing of image data so that mutually adjacent portions in the display area may be arranged into different ones of the memory modules 220 to 230. Consequently, where a plane such as a triangle is to be plotted, it can be processed simultaneously in the plane, and consequently, the operation probabilities of the individual DRAM modules are very high.

The memory controllers 350, 360, 370 and 380 are connected to the memory modules 200, 210, 220 and 230 through writing system wiring line sets 401W, 402W, 411W, 412W, 421W, 422W, 431W and 432W and reading system wiring line sets 401R, 402R, 411R, 412R, 421R, 422R, 431R and 432R so that they control accessing to the memory modules 200, 210, 220 and 230, respectively. Particularly, upon writing, the memory controllers 350, 360, 370 and 380 write (R, G, B) data and z data for four pixels outputted from the distributor 300 and inputted from the address converters 310, 320, 330 and 340 simultaneously into the memory modules 200, 210, 220 and 230 through the writing system wiring line sets 401W, 402W, 411W, 412W, 421W, 422W and 431W, 432W, respectively. At this time, for example, in the memory module 200, (R, G, B) data and z data for one pixel are stored into each of the banks 201A, 201B, 202A and 202B as described hereinabove. This similarly applies also to the memory modules 210, 220 and 230.

Further, each of the memory controllers 350, 360, 370 and 380 outputs, when the state machine of itself is in an idle state, an idle signal S350, S360, S370 or S380 in an active state to the read controller 390, receives a read address and a read request signal S391 outputted from the read controller 390 in response to the idle signal S350, S360, S370 or S380, reads out data through the reading system wiring line sets 401R, 402R, 411R, 412R, 421R, 422R or 431R, 432R and outputs the read out data to the read controller 390 through the reading system wiring line sets 351, 361, 371 and 381 and a wiring line set 440. It is to be noted that, in the present embodiment, the number of wiring lines of the writing system wiring line sets 401W, 402W, 411W, 412W, 421W, 422W, and 431W, 432W and the reading system wiring line sets 401R, 402R, 411R, 412R, 421R, 422R and 431R, 432R is 128 (128 bits), the number of wiring lines of the reading system wiring line sets 351, 361, 371 and 381 is 256 (256 bits), and the number of wiring lines of the wiring line set 440 is 1,024 (1,024 bits).

Referring back to FIG. 12, the read controller 390 includes an address converter 391 and a data arithmetic operation processing section 392. When a read address ADRR is received, if the idle signals S350, S360, S370 and S380 all in an active state from the memory controllers 350, 360, 370 and 380 are received, then the address converter 391 outputs a read address and a read request signal S391 to the memory controllers 350, 360, 370 and 380 in response to the idle signals S350, S360, S370 and S380 so that reading out may be performed in a unit of 8 or 16 pixels.

The data arithmetic operation section 392 receives texture data, (R, G, B) data, z data and texture color lookup table data of a unit or 8 or 16 pixels read out by the memory controllers 350, 360, 370 and 380 in response to the read address and the read request signal S391 through the wiring line set 440, performs predetermined arithmetic operation processing for the received data and outputs resulting data to the source of the request, for example, the texture engine circuit 145 or the CRT control circuit 147. When all of the memory controllers 350, 360, 370 and 380 are in an idle state, the read controller 390 outputs a read address and a read request signal S391 and receives read data as described hereinabove, and therefore, data to be read out can be synchronized with each other. Accordingly, the read controller 390 need not include a storage circuit such as a FIFO (First In First Out) circuit for temporarily storing data, thereby achieving reduction of the circuit scale.

Subsequently, operation of the system having the construction described above is described. In the three-dimensional computer graphics system 10, data for graphics plotting and so forth are supplied from the main memory 12 of the main processor 11 or the I/O interface circuit 13, which receives graphics data from the outside, to the rendering circuit 14 through the main bus 15. It is to be noted that, when necessary, data for graphics plotting and so forth are subject to geometry processing such as coordinate conversion, clipping processing or lighting processing by the main processor 11 or some other element.

The graphics data for which the geometry processing has been completed are used as polygon rendering data S11 which include apex coordinates x, y, z of the three apexes of a triangle, brightness values R, G, B, and texture coordinates s, t, q corresponding to pixels to be plotted. The polygon rendering data S11 are successively transferred to the DDA setup circuit 143 through the host I/F 141 and the input buffer 142 of the rendering circuit 14. At this time, data for a plurality of ones of the apexes of the triangle can be stored into the input buffer 142 through the host I/F 141 thereby to minimize the transfer waiting time and raise the efficiency in processing.

The DDA setup circuit 143 produces variation data S143 representative of a difference between a side of the triangle and the horizontal direction or the like based on the polygon rendering data S11. More particularly, the DDA setup circuit 143 calculates the value of a start point and the value of an end point and calculates a variation of the value to be determined upon movement of a unit length using a distance between the start point and the end point and outputs the variation as variation data S143 to the triangle DDA circuit 144 arranged adjacent the DDA setup circuit 143.

The triangle DDA circuit 144 uses the variation data S143 to calculate linearly interpolated (z, R, G, B, s, t, q) data of each pixel in the inside of the triangle. Then the thus calculated (z, R, G, B, s, t, q) data and the (x, y) data of the apexes of the triangle are outputted as DDA data S 144 to the texture engine circuit 145 arranged adjacent the triangle DDA circuit 144.

The texture engine circuit 145 performs an arithmetic operation of dividing the s data by the q data of the (s, t, q) data represented by the DDA data S 144 and another arithmetic operation of dividing the t data by the q data. The, the division results "s/q" and "t/q" are multiplied by the texture sizes USIZE and VSIZE, respectively, to produce texture coordinate data (u, v). Thereafter, the texture engine circuit 145 outputs a read request including the thus produced texture coordinate data (u, v) to the memory I/F circuit 146. Consequently, the (R G, B) data S150 stored in the SRAM 150 are read out through the memory I/F circuit 146.

Then, the texture engine circuit 145 multiplies the (R, G, B) data of the thus read out (R, G, B) data S 150 by the (R, G, B) data included in the DDA data S144 received from the triangle DDA circuit 144 in the preceding stage to produce pixel data S145. The pixel data S145 are outputted from the texture engine circuit 145 to the memory I/F circuit 146.

For the full color displaying, the data (R, G, B) from the texture buffer 149*a* may be used directly. However, where the index color displaying is used, the data of the color index table produced in advance are transferred from the texture CLUT buffer 149*d* to the temporary storage buffer formed from the SRAM or the like, and consequently, actual R, G, B colors are obtained from a color index using the color lookup table stored in the temporary storage buffer. It is to be noted that, where the color lookup table is formed from an SRAM, it is used such that, if a color index is inputted to an address of the SRAM, actual R, G, B colors appear at outputs of the SRAM.

The memory I/F circuit 146 compares the z data corresponding to the pixel data S145 inputted from the texture engine circuit 145 and the z data stored in the z buffer 149*c* with each other to discriminate whether or not an image to be plotted with the inputted pixel data S 145 is positioned forwardly of (on the viewpoint side with respect to) an image which was written into the display buffer 21 in the preceding cycle. If the discrimination reveals that the current image is positioned forwardly of the preceding image, then the z data stored in the z buffer 149*c* is updated with the z data corresponding to the pixel data S145. Then, the memory I/F circuit 146 writes the (R, G, B) data into the display buffer 149*b*.

The data to be written (including updating) are supplied to the memory controllers 350, 360, 370 and 380 through the distributor 300 and the address converters 310, 320, 330 and 340, which are writing system circuits. Consequently, the data are written parallelly into a predetermined memory through the writing system wiring line sets 401W, 402W, 411W, 412W, 421W, 422W and 431W, 432W by the memory controllers 350, 360, 370 and 380, respectively. The memory I/F circuit 146 calculates a memory block, in which a texture corresponding to a texture address of a pixel to be plotted next is stored, from the texture address and issues a read request only to the memory block so that the texture data is read out from the memory block. In this instance, since any other memory block which does not have the pertaining texture data stored therein is not accessed for reading out of texture data, a longer access time can be allocated to plotting.

Also upon plotting, the memory I/F circuit 146 issues a read request to a memory block, in which pixel data corresponding to an address of a pixel to be plotted next is stored, to read out the pixel data from the pertaining address, modifies the read out pixel data and writes the modified pixel data back into the same address of the memory block. When invisible face processing is to be performed, the memory I/F circuit 146 similarly issues a read request to a memory block, in which depth data corresponding to an address of a pixel to be plotted next is stored, to read out the depth data from the pertaining address, modifies the read out depth data if necessary and writes the modified depth data back into the same address of the memory block. In the transfer of data to and from the DRAM 149 through the memory I/F circuit 146, the plotting performance can be augmented through parallel processing of the processes till then.

Particularly either by forming the triangle DDA circuit 144 and the texture engine circuit 145 in a parallelly executing form and inserting pipelines finely (temporally parallelly) or providing them in the same circuit (spatially parallelly) to partially increase the operation frequency, simultaneous calculation for a plurality of pixels is performed. Further, the pixel data are arranged under the control of the memory I/F circuit 146 such that adjacent portions thereof in the display area belong to different DRAM modules from each other. Due to the arrangement, where such a plane as a triangle is to be plotted, it is processed simultaneously on the plane. Therefore, the operation probabilities of the individual DRAM modules are very high.

When an image is to be displayed on the CRT not shown, the CRT control circuit 147 produces a display address in synchronism with horizontal and vertical synchronizing frequencies given thereto and issues a request for transfer of display data to the memory I/F circuit 146. The memory I/F circuit 146 transfers display data of a fixed united amount to the CRT control circuit 147 in accordance with the request. The CRT control circuit 147 stores the display data into the display FIFO or a like circuit not shown and transfers an index value for RGB data at fixed intervals to the RAMDAC circuit 148. It is to be noted that, when a read request for data stored in the DRAM 149 or the SRAM 150 is received by the memory I/F circuit 146 as described above, a read address ADRR is inputted to the address converter 391 of the read controller 390.

At this time, the address converter 391 checks whether or not the idle signals S350, S360, S370 and S380 from the memory controllers 350, 360, 370 and 380 are inputted all in an active state. Then, if the idle signals S350, S360, S370 and S380 are inputted all in an active state, then the address converter 391 outputs a read address: and a read request signal S391 to the memory controllers 350, 360, 370 and 380 in response to the idle signals S350, S360, S370 and S380 so that data may be read out in a unit of 8 or 16 pixels.

In response to the read address and the read request signal S391, the memory controllers 350, 360, 370 and 380 read out texture data, (R, G, B) data, z data and texture color lookup table data in a unit of 8 or 16 pixels parallelly through the reading system wiring line sets 401R, 402R, 411R, 412R, 421R, 422R and 431R, 432R and input the read out data to the data arithmetic operation processing section 392 through the reading system wiring line sets 351, 361, 371 and 381 and the wiring line set 440. Then, the data arithmetic operation processing section 392 performs predetermined arithmetic operation processing and outputs resulting data to the source of the request, for example, the texture engine circuit 145 or the CRT control circuit 147.

RGB values corresponding to indices of RGB colors are stored in the RAM of the RAMDAC circuit 148, and RGB values corresponding to the index value inputted are transferred to the D/A converter not shown. Then, the RGB values are converted into analog signals by the D/A converter, and the analog RGB signals are transferred to the CRT.

As described above, with the present embodiment, since it includes the input buffer 142 having a capacity for more than one apex of a plotting primitive (principally a triangle) so that processing of inputted data may be performed optimally, almost any processing can be started at a point of time when data for one apex are prepared. Therefore, data for a next apex can be stored parallelly before next processing is enabled, and consequently, interruptions of processing are reduced.

Further, the arrangement of the host I/F 141 and the input buffer 142 for data transfer to and from the outside on one side of the logic circuit block allows minimization of the dispersion and the length of the wiring lines from the interface to the processing block. In order to allow such arrangement, it can be set as a target to design the width and the transfer rate as well as the transfer protocol of the bus to the host apparatus as wiring lines of the system so that they may be optimum to the process generation and a package of a semiconductor to be used. To this end, it is significant to initially set it as a designing target to arrange the host I/F for data transfer to and from the outside on one side of the logic circuit block.

Where the DDA setup circuit 143 as an initialization arithmetic operation circuit block for linear interpolation operation is arranged adjacent the host I/F 141 for data transfer and the input buffer 142 and the triangle DDA circuit 144 as a linear interpolation processing circuit block is arranged adjacent the DDA setup circuit 143, data can be transferred in the highest efficiency with regard to initialization arithmetic operation for linear interpolation operation to fully use the bandwidth of data transfer to and from the host apparatus. The arrangement of the DDA setup circuit 143 for linear interpolation operation at the specific place realizes optimum data transfer in a pipeline structure for data processing in the three-dimensional graphics plotting processing method of the present invention.

Generally speaking, the types of blocks to be processed and an optimum arrangement relationship of them can be specified depending upon the type of a three-dimensional graphics process to be performed. In this regard, the final performance of the system depends much upon in what manner the sizes and the functions of blocks which can be arranged actually are determined and designed. While three-dimensional graphics plotting involves a texture process for applying a pattern to a graphic form, since the processing in the present embodiment is performed immediately after the linear interpolation operation process, the texture processing circuits 145 and 146 are arranged adjacent the linear interpolation operation processing circuit block to optimize the transfer path between them.

Further, the function allocation is performed so that the sizes of the texture processing circuits 145 and 146 may be greater than the sizes of the blocks in the preceding processing stages to them. Consequently, the texture processing circuit block which accesses a memory of a large capacity most frequently can be arranged readily so that it can optimally access the memory of the large capacity arranged around the same.

Further, since the memory blocks 149 and 150 having a capacity sufficient to store display data (including texture data) in almost all cases assume a very large area such as more than one half the area of a chip, the lengths themselves of wiring lines between the display buffer and a block which performs graphics processing are comparatively great and have a great dispersion. Therefore, where the system is configured such that the registers 151 and 152 whose operation cannot be controlled from the block which performs graphics processing can be inserted in and arranged at one or both of the input and the output of the display buffer, the delay times by the wiring lines which are long and delay signal transfer can be fixed within a fixed range and the performance of the entire system can be augmented. Further, where a register whose operation cannot be controlled such as to stop the operation is employed, the necessity to take a delay or the like of a controlling signal therefor into consideration is eliminated and the limitation to the performance can be raised.

Further, where the memory block which can sufficiently store display data is constructed so as to have two or more ports, the transfer performance can be augmented although the memory block itself has a greater size. Particularly, upon three-dimensional graphics plotting, where writing into the display memory, reading out from the texture buffer 149*a* which is physically same as the display memory and reading out from the display buffer 149*b* for displaying data can be performed simultaneously and parallelly, the performance of the entire system can be augmented. Not an architecture wherein long wiring lines are required in a large area, but another architecture wherein wiring lines can be concluded locally although a comparatively large area is required is advantageous to a semiconductor process which is estimated to require further refined working in the future.

Where the block sizes of the texture processing circuits 145 and 146 are made greater than those of the DDA setup circuit 143 and the triangle DDA circuit 144, the individual blocks which implement the individual processes can be arranged reasonably. In particular, the architecture of the entire system is configured so that the sizes of the DDA setup circuit 143 and the triangle DDA circuit 144 may not become greater than the sizes of the texture processing circuits 145 and 146.

Further, where the memory block is divided into and distributed in a plurality of blocks A and B arranged around the logic circuit block and addresses of the distributed memory blocks A and B are interleaved such that the distributed memory blocks A and B may be accessed in order by successive accessing to the display area at least in one direction, dispersions in power compensation and voltage drop in the inside of the chip are reduced. Also, where the memory block is formed from the DRAM 149, interruption of processing by a page break upon memory accessing can be concealed.

Further, where the DDA setup circuit 143 has a temporally parallel structure according to a synchronous pipeline system and the texture processing circuit block has a spatially parallel structure wherein a plurality of circuits of the same structure are juxtaposed, in initialization arithmetic operation for linear interpolation operation, the initialization arithmetic operation circuit block can be made smaller than the texture processing circuit block through the temporally parallel scheme. Meanwhile, in texture processing wherein the bandwidth with the memory becomes a bottleneck, the bus width to the memory can be secured readily through the spatially parallel scheme. Since the memory block used as the display buffer is the DRAM 149 and the SRAM 150 is directly coupled to some of ports of the DRAM 149 while data of a plurality of columns of the memory block are transferred to the SRAM at once by accessing to the DRAM 149 in the row direction, a page break of the DRAM 149 can be, concealed. Further, the efficiency in accessing to the other ports of the DRAM 149 can be augmented.

Further, since the DDA setup circuit 143 is mounted using the ASIC technique and calculates values at a representative place of a plurality of pixels. first and then calculates values of the other neighboring pixels through addition of a fixed value calculated already from the representative point and besides discriminates through a positive/negative discrimination of a linear expression whether or not a noticed point is within a triangle, the linear interpolation operation part can be made smaller than the texture processing part. The triangle DDA circuit 144 performs processing of pixels within a fixed range which is set independently of the form of the display memory and independently of a page boundary. Consequently, processing of those pixels which are not plotted actually can be reduced, and the circuit scale for achieving the object performance can be reduced.

Furthermore, since a FIFO buffer is arranged on the receiving side of a bus between circuit blocks which are physically separate from each other and a signal for notification that the FIFO will be fully occupied soon is issued from the receiving side to the data signaling side to stop operation of the data signaling side, a pipe can be inserted into a control signal between the circuit blocks. Consequently, the operation frequency of the entire system can be raised.

Further, in the present embodiment, since display data and texture data which are required at least by one graphic form element are stored into the DRAM 149 built in the inside of a semiconductor chip, texture data can be stored into any other portion of the DRAM 149 than the display area, and consequently, effective utilization of the built-in DRAM can be anticipated. Therefore, an image processing apparatus which achieves both of high speed operation and reduced power consumption can be achieved.

Further, a single-memory system can be implemented, and all processing can be performed in the built-in blocks. As a result, an architecture of a large paradigm shift can be anticipated.

Further, since effective utilization can be achieved, processing is possible only with the DRAM provided in the apparatus, and a great bandwidth between the memory and the plotting system which is provided by the fact that the DRAM is provided in the inside of the apparatus can be utilized sufficiently. Further, also it is possible to incorporate special processing into the DRAM.

Further, since the same functions of the DRAM are provided parallelly as a plurality of modules, the efficiency of parallel operation can be augmented. The fact that merely the number of bits of data is great does not provide a high efficiency of use of data and the performance can be augmented only in a limited case of specific conditions. In order to augment an average performance, a plurality of modules having a rather high performance are provided to effectively utilize bit lines.

Furthermore, since display elements at adjacent addresses in a display address space are arranged so as to belong to mutually different blocks of the DRAM, further effective utilization of the bit lines can be achieved. Where accessing to a comparatively fixed display area occurs frequently as upon graphics plotting, the probability that the individual modules can be processed simultaneously increases and thus allows augmentation of the plotting performance.

Further, since indices to index colors and color lookup table values for them are stored in the inside of the DRAM 149 in order to store a greater amount of texture data, compression of the texture data is allowed, and efficient utilization of the built-in DRAM is allowed.

Further, since depth information of an object to be plotted is stored in the built-in DRAM, invisible face processing can be performed simultaneously and parallelly with plotting.

Usually, plotting is performed first, and then a result of the plotting is displayed. However, since texture data and display data can be stored in the same memory system as a unified memory, also it is possible to use plotting data as texture data without using the data directly for displaying. This is effective where texture data are produced by plotting when necessary. Also this is an effective function for preventing the amount of texture data from becoming great.

Since the DRAM 149 is built in a chip and therefore an interface part of the DRAM 149 is concluded within the chip, the necessity for an I/O buffer of a high load capacity or to drive an inter-chip wiring line capacity is eliminated, and consequently, the power consumption is reduced when compared with an alternative case wherein the DRAM 149 is not built in the chip. Consequently, a scheme which allows all necessary processing to be performed within one chip using various techniques is an essential technical factor to familiar digital apparatus such as a portable information terminal in the future.

Further, while the three-dimensional computer graphics system 10 described hereinabove with reference to FIG. 1 is configured such that it uses the RAMDAC circuit 148, it may otherwise be configured such that it does not include the RAMDAC circuit 148. Also, while the three-dimensional computer graphics system 10 shown in FIG. 1 is configured such that the geometry process for producing polygon rendering data is performed by the main processor 11, it may otherwise be configured such that the geometry process is performed by the rendering circuit 14.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

The invention is claimed as follows:

1. A graphics plotting apparatus which performs a rendering process, comprising:

- a logic circuit block;
- a memory block having a capacity sufficient to store display data to be displayed wherein the logic circuit block and the memory block are built in the same chip;
- an input buffer provided at an input portion of the logic circuit block and having a capacity for more than one apex of a three-dimensional graphics plotting primitive
- an initialization arithmetic operation circuit block for linear interpolation operation arranged adjacent the input buffer;
- a linear interpolation processing circuit block arranged adjacent the initialization arithmetic operation block for linear interpolation operation; and
- a texture processing circuit block arranged adjacent the linear interpolation operation processing circuit block.

2. A graphics plotting apparatus according to claim 1, further comprising an interface section for transferring data to and from outside the apparatus, the interface section being arranged on one side of the logic circuit block.

3. A graphics plotting apparatus according to claim 1, further comprising:

- a circuit block for performing a graphics process; and
- a register arranged between the memory block having a capacity to sufficiently store display data, operation of the register being uncontrollable from the circuit block for performing the graphics process.

4. A graphics plotting apparatus according to claim 1, wherein the memory block has two or more ports.

5. A graphics plotting apparatus according to claim 3, wherein the memory block has at least two ports.

6. A graphics plotting apparatus according to claim 1, wherein the memory block is divided into and distributed in a plurality of blocks which are arranged around the logic circuit block, and further comprising a part for interleaving addresses of the distributed memory blocks so that the distributed blocks may be accessed in order by successive accessing in at least one direction of a display area for the display data.

7. A graphics plotting apparatus according to claim 1, wherein the initialization arithmetic operation circuit block for linear interpolation operation has a temporally parallel structure of a synchronizing pipeline system, and the texture processing circuit block has a spatially parallel structure wherein a plurality of circuits of a same structure are juxtaposed.

8. A graphics plotting apparatus according to claim 1, wherein the memory block is formed from a DRAM used as a display buffer, and an SRAM is connected to some ports of the DRAM, the memory block transferring a plurality of column data at a time to the SRAM by accessing to the DRAM in a row direction.

9. A graphics plotting apparatus according to claim 1, wherein the initialization arithmetic operation circuit block for linear interpolation operation is mounted using an ASIC technique.

10. A graphics plotting apparatus which receives polygon rendering data of apexes of a unit graphic form including three-dimensional coordinates (x, y, z), red, green and blue data, homogeneous coordinates (s, t) of a texture and a homogeneous term q to perform a rendering process, comprising:

- a memory block for storing display data and texture data required at least by one graphic form element;
- a logic circuit block including an interpolation processing circuit block for interpolating polygon rendering data of the apexes of the unit graphic form to produce interpolation data of pixels positioned in the unit graphic form and a texture processing circuit block for dividing the homogeneous coordinates (s, t) of the texture included in the interpolation data by the homogeneous term q to produce s/q and t/q, reading out the texture data from the memory block using texture addresses corresponding to s/q and t/q and performing application processing of the texture data to the surface of the graphic form elements of the display data; and
- an input buffer provided at an input portion for the polygon rendering data of the interpolation processing circuit block of the logic circuit block and having a capacity for more than one apex of a three-dimensional graphics plotting primitive;

wherein the memory block, the logic circuit block and the input buffer are mounted in a mixed state in one semiconductor chip.

11. A graphics plotting apparatus according to claim 10, further comprising an interface section for transferring data to and from the apparatus outside, the interface section being arranged on one side of the logic circuit block.

12. A graphics plotting apparatus according to claim 10, wherein the interpolation processing circuit block includes an initialization arithmetic operation circuit block for linear interpolation operation and a linear interpolation processing block, the initialization arithmetic operation block for linear interpolation operation being arranged adjacent the input buffer and wherein the linear interpolation processing circuit block is arranged adjacent the initialization arithmetic operation block for linear interpolation operation.

13. A graphics plotting apparatus according to claim 11, wherein the interpolation processing circuit block includes an initialization arithmetic operation circuit block for linear interpolation operation and a linear interpolation processing block, the initialization arithmetic operation block for linear interpolation operation being arranged adjacent the input buffer and wherein the linear interpolation processing circuit block is arranged adjacent said initialization arithmetic operation block for linear interpolation operation.

14. A graphics plotting apparatus according to claim 12, wherein the texture processing circuit block is arranged adjacent the linear interpolation operation processing circuit block.

15. A graphics plotting apparatus according to claim 13, wherein the texture processing circuit block is arranged adjacent the linear interpolation operation processing circuit block.

16. A graphics plotting apparatus according to claim 10, wherein the memory block has at least two ports.

17. A graphics plotting apparatus according to claim 10, further comprising a register arranged between the memory block and the texture processing circuit block, operation of the register being uncontrollable from the texture processing circuit block wherein the memory block has at least two ports.

18. A graphics plotting apparatus according to claim 10, wherein the memory block is divided into and distributed in a plurality of blocks which are arranged around the logic circuit block, and further comprising a part for interleaving addresses of the distributed memory blocks so that said distributed blocks may be accessed in order by successive accessing in at least one direction of a display area for the display data.

19. A graphics plotting apparatus according to claim 14, wherein the initialization arithmetic operation circuit block for linear interpolation operation has a temporally parallel structure of a synchronizing pipeline system, and the texture processing circuit block has a spatially parallel structure wherein a plurality of circuits of a same structure are juxtaposed.

20. A graphics plotting apparatus according to claim 10, wherein the memory block is formed from a DRAM used as a display buffer, and an SRAM is connected to some ports of the DRAM, the memory block transferring a plurality of column data at a time to the SRAM by accessing to the DRAM in a row direction.

21. A graphics plotting apparatus according to claim 10, wherein the interpolation processing circuit block includes an initialization arithmetic operation circuit block for linear interpolation operation and a linear interpolation processing block, the initialization arithmetic operation block for linear interpolation operation being arranged adjacent the input buffer wherein the initialization arithmetic operation circuit block for linear interpolation operation first calculates values only of a representative place of a plurality of pixels and then calculates values of other neighboring pixels by addition of fixed values calculated already from the representative points.

22. A graphics plotting apparatus according to claim 10, wherein the interpolation processing circuit block includes an initialization arithmetic operation circuit block for linear interpolation operation and a linear interpolation processing block, the initialization arithmetic operation block for linear interpolation operation being arranged adjacent the input buffer wherein the initialization arithmetic operation circuit block for linear interpolation operation is mounted using an ASIC technique.

23. A graphics plotting apparatus which performs a rendering process, comprising:

a logic circuit block;

a memory block having a capacity sufficient to store display data to be displayed wherein the logic circuit block and the memory block are built in the same chip;

an input buffer provided at an input portion of the logic circuit block and having a capacity for more than one apex of a three-dimensional graphics plotting primitive;

an initialization arithmetic operation circuit block for linear interpolation operation arranged adjacent the input buffer;

a linear interpolation processing circuit block arranged adjacent the initialization arithmetic operation block for linear interpolation operation; and a texture processing circuit block arranged adjacent the linear interpolation operation processing circuit block, wherein the texture processing circuit block has a block size greater than respective block sizes of the initialization arithmetic operation circuit block for linear interpolation operation and the linear interpolation processing circuit block.

24. A graphics plotting apparatus which performs a rendering process, comprising:

a logic circuit block;

a memory block having a capacity sufficient to store display data to be displayed wherein the logic circuit block and the memory block are built in the same chip;

an input buffer provided at an input portion of the logic circuit block and having a capacity for more than one apex of a three-dimensional graphics plotting primitive;

an interface section for transferring data to and from outside the apparatus, the interface section being arranged on one side of the logic circuit block;

an initialization arithmetic operation circuit block for linear interpolation operation arranged adjacent the input buffer;

a linear interpolation processing circuit block arranged adjacent the initialization arithmetic operation block for linear interpolation operation; and a texture processing circuit block arranged adjacent the linear interpolation operation processing circuit block, wherein the texture processing circuit block has a block size greater than respective block sizes of the initialization arithmetic operation circuit block for linear interpolation operation and the linear interpolation processing circuit block.

25. A graphics plotting apparatus which performs a rendering process, comprising:

a logic circuit block;

a memory block having a capacity sufficient to store display data to be displayed wherein the logic circuit block and the memory block are built in the same chip;

an input buffer provided at an input portion of the logic circuit block and having a capacity for more than one apex of a three-dimensional graphics plotting primitive; and an initialization arithmetic operation circuit block for linear interpolation operation arranged adjacent the input buffer, wherein the initialization arithmetic operation circuit block for linear interpolation operation first calculates values only of a representative place of a plurality of pixels and then calculates values of other neighboring pixels by addition of fixed values calculated already from one or more representative points.

26. A graphics plotting apparatus which performs a rendering process, comprising:

a logic circuit block;

a memory block having a capacity sufficient to store display data to be displayed wherein the logic circuit block and the memory block are built in the same chip;

an input buffer provided at an input portion of the logic circuit block and having a capacity for more than one apex of a three-dimensional graphics plotting primitive; and an initialization arithmetic operation circuit block for linear interpolation operation arranged adjacent the input buffer, wherein the initialization arithmetic operation circuit block for linear interpolation operation discriminates through positive/negative discrimination of a linear expression whether a noticed point is in an inside of a triangle.

27. A graphics plotting apparatus which performs a rendering process, comprising:

a logic circuit block;

a memory block having a capacity sufficient to store display data to be displayed wherein the logic circuit block and the memory block are built in the same chip;

an input buffer provided at an input portion of the logic circuit block and having a capacity for more than one apex of a three-dimensional graphics plotting primitive;

an initialization arithmetic operation circuit block for linear interpolation operation arranged adjacent the input buffer;

a linear interpolation processing circuit block arranged adjacent the initialization arithmetic operation circuit block for linear interpolation operation; and a texture processing circuit block arranged adjacent the linear interpolation operation processing circuit block, wherein the initialization arithmetic operation circuit block for linear interpolation operation has a temporally parallel structure of a synchronizing pipeline system, and the texture processing circuit block has a spatially parallel structure wherein a plurality of circuits of a same structure are juxtaposed.

28. A graphics plotting apparatus which receives polygon rendering data of apexes of a unit graphic form including three-dimensional coordinates (x, y, z), red, green and blue data, homogeneous coordinates (s, t) of a texture and a homogeneous term q to perform a rendering process, comprising:

a memory block for storing display data and texture data required at least by one graphic form element;

a logic circuit block including an interpolation processing circuit block for interpolating polygon rendering data of the apexes of the unit graphic form to produce interpolation data of pixels positioned in the unit graphic form, wherein the interpolation processing circuit block includes an initialization arithmetic operation circuit block for linear interpolation operation and a linear interpolation processing block, wherein the initialization arithmetic operation circuit block for linear interpolation operation has a temporally parallel structure of a synchronizing pipeline system and is arranged adjacent the input buffer and wherein the linear interpolation processing circuit block is arranged adjacent the initialization arithmetic operation block for linear interpolation operation, and a texture processing circuit block for dividing the homogeneous coordinates (s, t) of the texture included in the interpolation data by the homogeneous term q to produce s/q and t/q, reading out the texture data from the memory block using texture addresses corresponding to s/q and t/q and performing application processing of the texture data to the surface of the graphic form elements of the display data, wherein the texture processing circuit block has a spatially parallel structure wherein a plurality of circuits of a same structure are juxtaposed; and an input buffer provided at an input portion for the polygon rendering data of the interpolation processing circuit block of the logic circuit block and having a capacity for more than one apex of a three-dimensional graphics plotting primitive;

wherein the memory block, the logic circuit block and the input buffer are mounted in a mixed state in one semiconductor chip, and the texture processing circuit block is arranged adjacent the linear interpolation operation processing circuit block.

29. A graphics plotting apparatus which receives polygon rendering data of apexes of a unit graphic form including three-dimensional coordinates (x, y, z), red, green and blue data, homogeneous coordinates (s, t) of a texture and a homogeneous term q to perform a rendering process, comprising:

a memory block for storing display data and texture data required at least by one graphic form element;

a logic circuit block including an interpolation processing circuit block for interpolating polygon rendering data of the apexes of the unit graphic form to produce interpolation data of pixels positioned in the unit graphic form and a texture processing circuit block for dividing the homogeneous coordinates (s, t) of the texture included in the interpolation data by the homogeneous term q to produce s/q and t/q, reading out the texture data from the memory block using texture addresses corresponding to s/q and t/q and performing application processing of the texture data to the surface of the graphic form elements of the display data, wherein the interpolation processing circuit block includes an initialization arithmetic operation circuit block for linear interpolation operation and a linear interpolation processing block, the initialization arithmetic operation block for linear interpolation operation being arranged adjacent the input buffer wherein the initialization arithmetic operation circuit block for lin ear interpolation operation first calculates values only of a representative place of a plurality of pixels and then calculates values of other neighboring pixels by addition of fixed values calculated already from the representative points; and an input buffer provided at an input portion for the polygon rendering data of the interpolation processing circuit block of the logic circuit block and having a capacity for more than one apex of a three-dimensional graphics plotting primitive;

wherein the memory block, the logic circuit block and the input buffer are mounted in a mixed state in one semiconductor chip.

* * * * *